US012579661B2

(12) United States Patent
Guo et al.

(10) Patent No.: US 12,579,661 B2
(45) Date of Patent: Mar. 17, 2026

(54) METHODS, SYSTEMS, AND STORAGE MEDIUMS FOR FLOW VELOCITY DETECTION

(71) Applicant: WUHAN UNITED IMAGING HEALTHCARE CO., LTD., Hubei (CN)

(72) Inventors: Guangdi Guo, Wuhan (CN); Oliver Heid, Erlangen (DE)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 564 days.

(21) Appl. No.: 17/935,075

(22) Filed: Sep. 23, 2022

(65) Prior Publication Data

US 2023/0186491 A1 Jun. 15, 2023

Related U.S. Application Data

(63) Continuation of application No. PCT/CN2021/137949, filed on Dec. 14, 2021.

(51) Int. Cl.
| | |
|---|---|
| *G06T 7/246* | (2017.01) |
| *G01S 13/58* | (2006.01) |
| *G01S 15/58* | (2006.01) |
| *G06T 1/20* | (2006.01) |

(52) U.S. Cl.
CPC .............. *G06T 7/248* (2017.01); *G01S 13/58* (2013.01); *G01S 15/58* (2013.01); *G06T 1/20* (2013.01); *G06T 2207/10044* (2013.01); *G06T 2207/10132* (2013.01)

(58) Field of Classification Search
CPC ........... G06N 3/08; G06T 7/248; G01S 13/58
See application file for complete search history.

(56) References Cited

U.S. PATENT DOCUMENTS

| | | | |
|---|---|---|---|
| 4,265,126 A | 5/1981 | Papadofrangakis et al. | |
| 10,548,571 B1 * | 2/2020 | Tian ....................... | A61B 8/488 |
| 2019/0046161 A1 | 2/2019 | Mansour et al. | |

(Continued)

FOREIGN PATENT DOCUMENTS

| | | |
|---|---|---|
| CN | 101828929 A | 9/2010 |
| CN | 102697524 A | 10/2012 |

(Continued)

OTHER PUBLICATIONS

Ricci S et al., Multi-line Measurements of Blood Velocity Vectors in Real-time, 2016 IEEE International Ultrasonics Proceedings, 2016, 4 pages.

(Continued)

*Primary Examiner* — Lam S Nguyen
(74) *Attorney, Agent, or Firm* — METIS IP LLC

(57) ABSTRACT

The embodiments of the present disclosure provide a method for a flow velocity detection. The method may include obtaining image data; determining, based on the image data, a parameter of at least one detection point, the parameter being related to a phase change; and determining a first flow velocity of the at least one detection point based on the parameter related to the phase change and a location relationship among the at least one detection point, at least one transmission point, and a plurality of receiving points.

16 Claims, 8 Drawing Sheets

700

Determining a resultant spatial displacement vector corresponding to each group of array elements based on a location relationship among at least one detection point, at least one transmission point, and a plurality of receiving points
710

Determining a first characteristic matrix corresponding to the each group of array elements based on the resultant spatial displacement vector corresponding to each group of array elements
720

Determining a first flow velocity of the at least one detection point based on a phase change rate of the at least one detection point corresponding to each group of array elements and the first characteristic matrix corresponding to each group of array elements
730

(56) References Cited

U.S. PATENT DOCUMENTS

| | | | |
|---|---|---|---|
| 2019/0254630 A1 | 8/2019 | Vignon et al. | |
| 2019/0365354 A1 | 12/2019 | Du | |
| 2020/0121289 A1 | 4/2020 | Tian | |
| 2020/0334829 A1* | 10/2020 | Wetzl | G06N 3/08 |
| 2021/0007706 A1 | 1/2021 | Du et al. | |

FOREIGN PATENT DOCUMENTS

| | | | |
|---|---|---|---|
| CN | 108186050 A | 6/2018 | |
| CN | 110327077 A | 10/2019 | |
| CN | 111652849 A | 9/2020 | |
| CN | 109414245 B | 4/2022 | |
| CN | 116763339 A | 9/2023 | |
| WO | 2018058606 A1 | 4/2018 | |
| WO | 2021042324 A1 | 3/2021 | |
| WO | 2021108953 A1 | 6/2021 | |

OTHER PUBLICATIONS

The Extended European Search Report in European Application No. 21967561.8 mailed on Dec. 19, 2024, 13 pages.

* cited by examiner

100

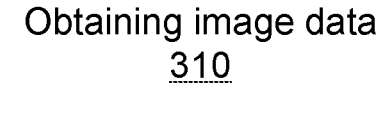

300

Obtaining image data
310

Determining, based on the image data, a
parameter of at least one detection point, the
parameter being related to a phase change
320

Determining a first flow velocity of the at least
one detection point based on the parameter
related to the phase change and the location
relationship among the at least one detection
point, the at least one transmission point, and
the plurality of receiving points
330

FIG. 3

Detection
region

Detection
region

Figures 7, 8:
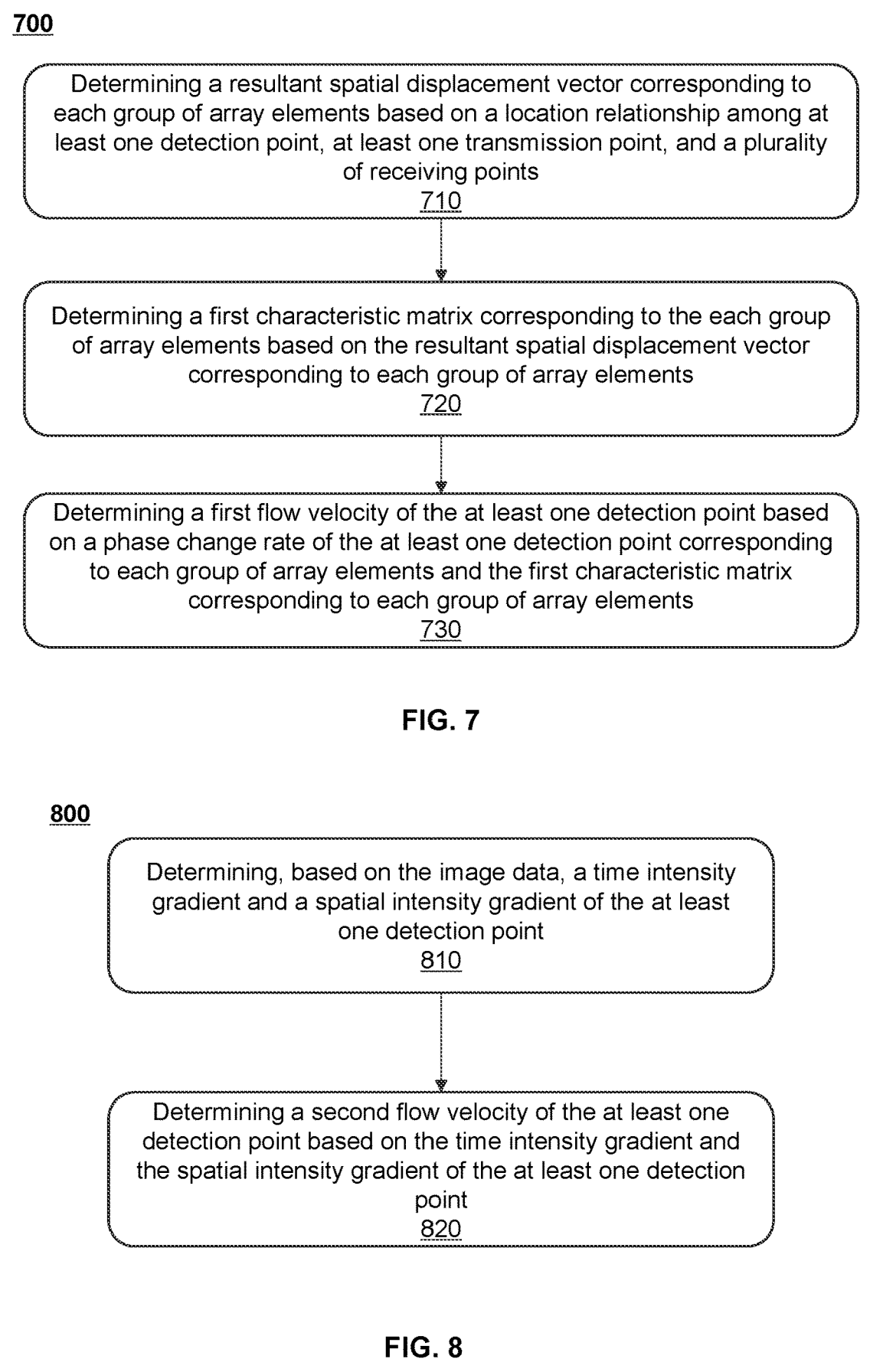

700

Determining a resultant spatial displacement vector corresponding to each group of array elements based on a location relationship among at least one detection point, at least one transmission point, and a plurality of receiving points
710

Determining a first characteristic matrix corresponding to the each group of array elements based on the resultant spatial displacement vector corresponding to each group of array elements
720

Determining a first flow velocity of the at least one detection point based on a phase change rate of the at least one detection point corresponding to each group of array elements and the first characteristic matrix corresponding to each group of array elements
730

Determining, based on the image data, a time intensity gradient and a spatial intensity gradient of the at least one detection point
810

Determining a second flow velocity of the at least one detection point based on the time intensity gradient and the spatial intensity gradient of the at least one detection point
820

METHODS, SYSTEMS, AND STORAGE MEDIUMS FOR FLOW VELOCITY DETECTION

CROSS-REFERENCE TO RELATED APPLICATIONS

This application is a continuation of International Application No. PCT/CN2021/137949, filed on Dec. 14, 2021, the contents of which are incorporated herein by reference in their entirety.

TECHNICAL FIELD

The present disclosure relates to a field of flow velocity detection, in particular, relates to systems, methods, and storage mediums for the flow velocity detection.

BACKGROUND

Flow velocity detection may refer to identifying a movement velocity of a target object based on image data of the target object. The image data of the target object may be obtained based on phase change of echo data of the target object at a same position at different time points. However, due to the restriction of scanning modes, only the phase change along a transmission direction may be detected. In order to obtain an accurate flow velocity of the target object, it is needed to adjust a transmission angle of a scanning signal or manually adjust position of a scanning probe.

Therefore, it is desirable to provide a method and system for flow velocity detection, which can automatically detect the flow velocity of the target object in any direction and improve the imaging frame rate.

SUMMARY

One aspect of the present disclosure may provide a method for flow velocity detection. The method may include: obtaining image data; determining, based on the image data, a parameter of at least one detection point, the parameter being related to a phase change; and determining a first flow velocity of the at least one detection point based on the parameter related to the phase change and a location relationship among the at least one detection point, at least one transmission point, and a plurality of receiving points.

Another aspect of the present disclosure may provide a system for flow velocity detection. The system may include: at least one storage medium storing a set of instructions; at least one processor in communication with the at least one storage medium, when executing the stored set of instructions, the at least one processor causes the system to obtain image data; determine, based on the image data, a parameter of at least one detection point, the parameter being related to a phase change; and determine a first flow velocity of the at least one detection point based on the parameter related to the phase change and a location relationship among the at least one detection point, at least one transmission point, and a plurality of receiving points.

Another aspect of the present disclosure may provide a system for flow velocity detection. The system may include: an image data obtaining module configured to obtain image data; a parameter determining module configured to determine, based on the image data, a parameter of at least one detection point, the parameter being related to a phase change; and a first flow velocity determining module configured to determine a first flow velocity of the at least one detection point based on the parameter related to the phase change and a location relationship among the at least one detection point, at least one transmission point, and a plurality of receiving points.

Another aspect of the present disclosure may provide a non-transitory computer readable medium including executable instructions, the instructions, when executed by at least one processor, causing the at least one processor to effectuate a method comprising: obtaining image data; determining, based on the image data, a parameter of at least one detection point, the parameter being related to a phase change; and determining a first flow velocity of the at least one detection point based on the parameter related to the phase change and a location relationship among the at least one detection point, at least one transmission point, and a plurality of receiving points.

The embodiments of the present disclosure may group array elements, and determine two-dimensional (2D) flow velocity of each detection point by using a location relationship among transmission points (transmission focuses), receiving points (array elements), and/or detection points, and combining with the phase change. Compare with a multi-angle transmission mode, a transmission may obtain phase change of a reflected signal under the multi-angle and detect the flow velocity of the target object perpendicular to the transmission direction, which may improve system utilization of data and the accuracy of system frame rate and speed evaluation. A full aperture transmission mode may be used to improve the imaging efficiency, and an unfocused wave mode may be used to make that the transmission scanning signals point to a same focus position, which can not only improve a signal to noise ratio, but also increase the frame rate of system, to improve the time resolution of the system. Based on the image data and the utilization of the optic flow method for calculating the second flow velocity of the at least one detection point, the flow velocity of the detection point in the three-dimensional movement field may be converted to the two-dimensional movement field for calculation. The first flow velocity and the second flow velocity may be obtained based on the time resolution (phase change) and spatial resolution (pixel intensity) of the system, respectively, and thus mutual verification and/or calibration may be achieved. By using a pixel beam synthesis method, using graphics processing unit (GPU) parallel computing based on a mode of grouped array elements, computing efficiency may be improved and hardware and time costs may be reduced.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein:

FIG. 3 is a flowchart illustrating an exemplary process for determining a first flow velocity of at least one detection point according to some embodiments of the present disclosure;

FIG. 7 is a schematic diagram illustrating an exemplary process of determining a first flow velocity of at least one detection point based on a parameter related to a phase change and a location relationship among the at least one detection point, at least one transmission point, and a plurality of receiving points according to some embodiments of the present disclosure;

FIG. 8 is a flowchart illustrating an exemplary process of determining a second flow velocity of at least one detection point according to some embodiments of the present disclosure.

DETAILED DESCRIPTION

Figure 1:
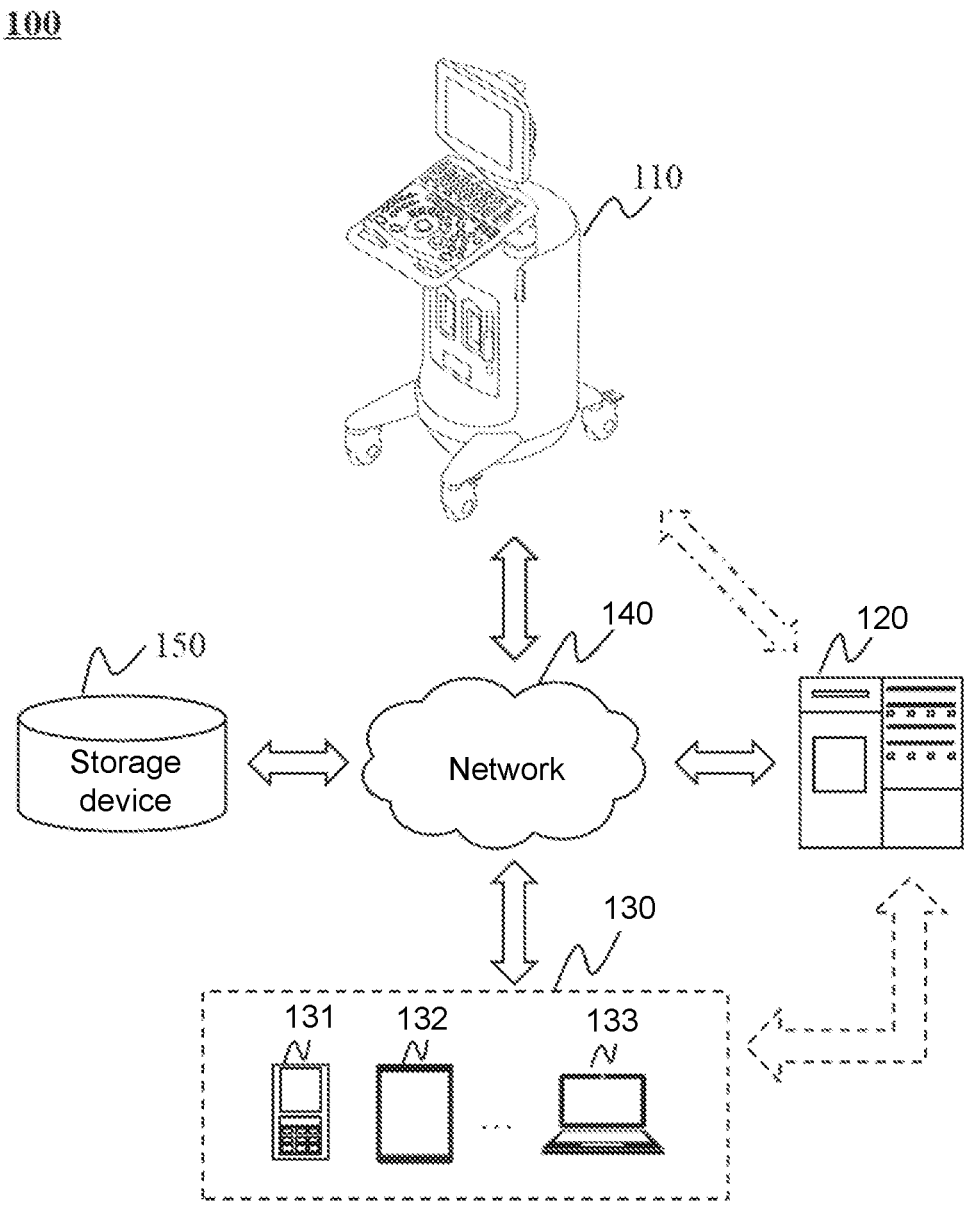
FIG. 1 is a schematic diagram illustrating an application scenario of a system for flow velocity detection according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

It should be understood that "system," "device," "unit" and/or "module" used in this specification is used for distinguishing different components, elements, parts or assemblies at different levels. However, if other words can achieve the same purpose, the above-mentioned words may be replaced by other expressions.

As used in the disclosure and the appended claims, the singular forms "a," "an," and "the" include plural referents unless the content clearly dictates otherwise. Generally speaking, the terms "comprise" and "include" only imply that the clearly identified steps and elements are included, and these steps and elements may not constitute an exclusive list, and the method or device may further include other steps or elements.

The flowcharts used in the present disclosure illustrate operations that the system implements according to the embodiment of the present disclosure. It should be understood that a previous operation or a subsequent operation of the flowcharts may not be accurately implemented in order. Instead, a plurality of steps may be processed in reverse or simultaneously. Moreover, other operations may further be added to these procedures, or one or more steps may be removed from these procedures.

FIG. 1 is a schematic diagram illustrating an application scenario of a system for flow velocity detection according to some embodiments of the present disclosure.

A flow velocity detection system 100 may determine a two-dimensional flow velocity by implementing a method and/or process disclosed in the present disclosure.

As shown in FIG. 1, the flow velocity detection system 100 may include: a scanning device 110, a processing device 120, a terminal device 130, a network 140, and/or a storage device 150, etc.

The components of the flow velocity detection system 100 may be connected in various ways. For example, as shown in FIG. 1, the scanning device 110 may be connected with the processing device 120 via the network 140. As another example, the scanning device 110 may be directly connected with the processing device 120 (as shown by a dashed two-way arrow connecting the scanning device 110 and the processing device 120). As a further example, the storage device 150 may be directly connected with the processing device 120 or via the network 140. As a further example, the storage device 150 may be directly (as shown by the dashed two-way arrow connecting the terminal device 130 and the processing device 120) and/or via the network 140 connected with the processing device 120.

The scanning device 110 may obtain scanning data by scanning a target object. In some embodiments, the scanning device 110 may transmit a signal (e.g., an ultrasonic wave) to the target object or a portion thereof and receive a reflected signal (e.g., a reflected ultrasonic wave) from the target object or a portion thereof. In some embodiments, the scanning device 110 may include a scanner. The scanning device may be used to transmit a signal and/or receive a signal. The scanning device may include but is not limited to an ultrasound probe, a radar probe, etc.

The processing device 120 may process data and/or information obtained from the scanning device 110, the terminal device 130, and/or the storage device 150. For example, the processing device 120 may determine a first flow velocity of at least one detection point based on the image data. As a further example, the processing device 120 may determine a target flow velocity of the at least one detection point based on the first flow velocity and the second flow velocity of the at least one detection point. In some embodiments, the processing device 120 may include a central processing unit (CPU), a digital signal processor (DSP), a system on a chip (SoC), a microcontroller unit (MCU), etc., and/or any combination thereof. In some embodiments, the processing device 120 may include a computer, a user console, a single server or group of servers, or the like. The server group may be centralized or distributed. In some embodiments, the processing device 120 may be local or remote. For example, the processing device 120 may access information and/or data stored in the scanning device 110, the terminal device 130, and/or the storage device 150 via the network 140. As another example, the processing device 120 may be directly connected with the scanning device 110, the terminal device 130, and/or the storage device 150 to access stored information and/or data. In some embodiments, the processing device 120 may be implemented on a cloud platform. By way of example only, the cloud platform may include a private cloud, a public cloud, a hybrid cloud, a community cloud, a distributed cloud, an inter-cloud, a multi-cloud, etc., or any combination thereof. In some embodiments, the processing device 120 or a portion of the processing device 120 may be integrated into the scanning device 110.

The terminal device 130 may receive instruction (e.g., an ultrasonic examination mode), and/or display a flow velocity detection result and/or an image to a user. The terminal device 130 may include a mobile device 131, a tablet computer 132, a notebook computer 133, etc., or any combination thereof. In some embodiments, the terminal device 130 may be part of the processing device 120.

The network 140 may include any suitable network that facilitates exchange of information and/or data for the flow velocity detection system 100. In some embodiments, one or more components of flow detection system 100 (e.g., the scanning device 110, the processing device 120, the storage device 150, the terminal device 130) may communicate information and/or via network 140 with the one or more other components of flow detection system 100. For example, the processing device 120 may receive user instructions from the terminal device via the network. As another example, the scanning device 110 may obtain an ultrasound transmission parameter from processing device 120 via the network 140. The network 140 may include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a long term evolution (LTE) network), a frame relay network, a virtual private network (VPN), a satellite network, a telephone network, a router server computer, and/or any combination thereof. For example, the network 140 may include a cable network, a wired network, an optical fiber network, a telecommunications network, an intranet, a wireless local area network (WLAN), a metropolitan area network (MAN), a public switched telephone network (PSTN), a Bluetooth™ network, a ZigBee™ network, a near field communication (NFC) network, or any combination thereof. In some embodiments, the network 140 may include one or more network access points. For example, the network 140 may include a wired and/or wireless network access point such as a base station and/or an internet switching point, the one or more components of flow velocity detection system 100 may be connected with the network 140 through the access points to exchange data and/or information.

The storage device 150 may store data, instruction, and/or any other information. In some embodiments, the storage device 150 may store data obtained from the scanning device 110, the terminal device 130, and/or the processing device 120. In some embodiments, the storage device 150 may store data and/or instruction, the processing device 120 execute or use the data and instruction to perform the exemplary method/system described in the present disclosure. In some embodiments, the storage device 150 may include a mass storage, a removable memory, a volatile read-write memory, a read-only memory (ROM), etc., or any combination thereof. The exemplary mass storage may include a magnetic disk, an optical disk, a solid-state disk, or the like. The exemplary removable memory may include a flash drive, a floppy disk, an optical disk, a memory card, a compressed disk, a magnetic tape, or the like. The exemplary volatile read/write memory may include a random access memory (RAM). The exemplary RAM may include a dynamic random access memory (DRAM), a double data rate synchronous dynamic random access memory (DDR SDRAM), a static random access memory (SRAM), a thyristor random access memory (T-RAM), a zero capacitance random access memory (Z-RAM), or the like. The exemplary ROM may include a mask read only memory (MROM), a programmable read only memory (PROM), an erasable programmable read only memory (EPROM), an electrically erasable programmable read only memory (EEPROM), an optical disk read only memory (CD-ROM), and a digital versatile disk read only memory. In some embodiments, the storage device 150 may be executed on a cloud platform. For example, the cloud platform may include a private cloud, a public cloud, a hybrid cloud, a community cloud, a distributed cloud, an internal cloud, a multi-layer cloud, or any combination thereof.

In some embodiments, the storage device 150 may communicate the one or more components of flow velocity detection system 100 (e.g., the scanning device 110, the processing device 120, the terminal device 130) by connecting with the network 140. The one or more components of flow velocity detection system 100 may access data or instructions stored in the storage device 150 via the network 140. In some embodiments, the storage device 150 may be directly connected or communicate with the one or more other components of the flow velocity detection system 100 (e.g., the scanning device 110, the processing device 120, the storage device 150, the terminal device 130). In some embodiments, the storage device 150 may be part of the processing device 120.

Figure 2:
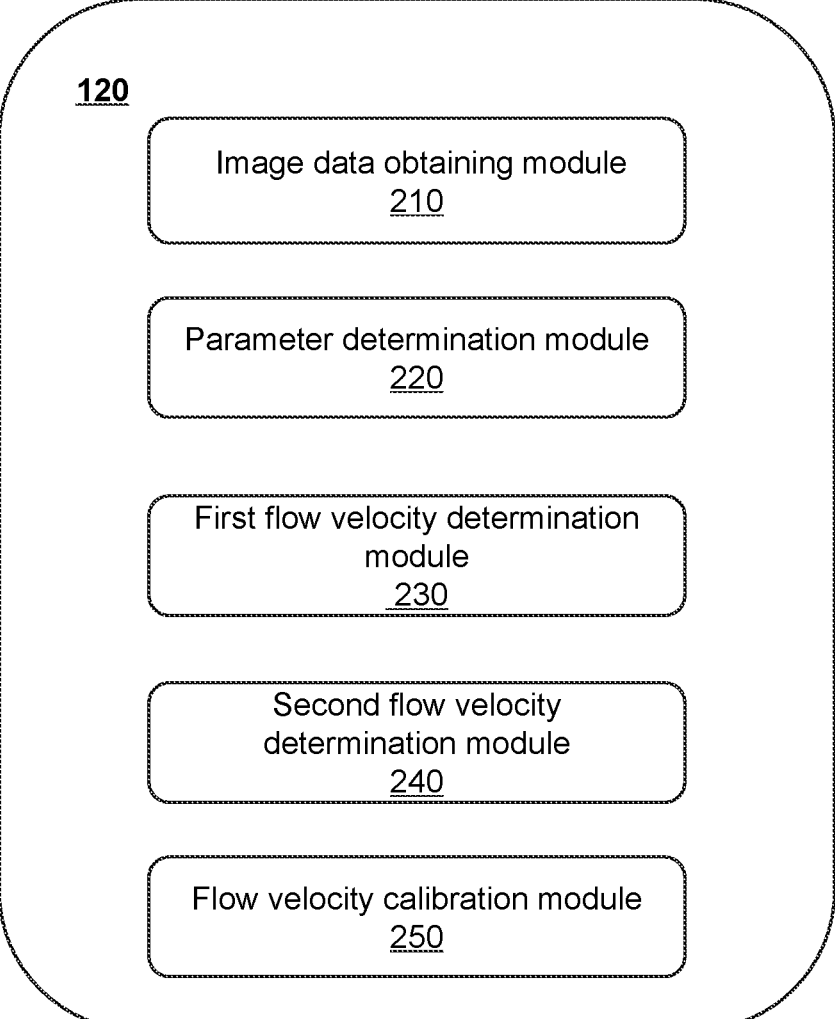
FIG. 2 is a block diagram illustrating a processing device for flow velocity detection according to some embodiments of the present disclosure.

FIG. 2 is a block diagram illustrating a processing device for flow velocity detection according to some embodiments of the present disclosure.

In some embodiments, the processing device 120 may include an image data obtaining module 210, a parameter determination module 220, and/or a first flow velocity determination module 230, a second flow velocity determination module 240 and/or a flow velocity calibration module 250.

The image data obtaining module 210 may be configured to obtain an image data. In some embodiments, the image data may include data obtained by scanning under a mode B.

In some embodiments, the image data obtaining module 210 may obtain the image data by utilizing full aperture transmission. In some embodiments, the full aperture transmission may include a full aperture transmission under an unfocused wave transmission mode.

In some embodiments, the image data obtaining module 210 may group array elements of a scanning probe to obtain a plurality of groups of array elements. Each group of array elements in the plurality of groups of array elements may include one or more array elements. In some embodiments, the scanning probe may include any one of a linear array probe, a convex array probe, and/or a phased array probe. In some embodiments, the image data may include a plurality of image data. In some embodiments, each group of image data in the plurality of groups of image data may correspond to a group of array elements in the plurality of groups of array elements. In some embodiments, a group of image data may be obtained by demodulation and/or beam synthesis based on the reflected signal received by the corresponding group of array elements.

The parameter determination module 220 may be configured to determine, based on the image data, a parameter of at least one detection point. The parameter may be related to a phase change. In some embodiments, the parameter related to a phase change may include a phase change rate. In some embodiments, the parameter determination module 220 may be configured to execute one or more of the following: determining at least two image data segments that are adjacent with respect to time received by each array element in the image data; determining a phase change rate of at least one detection point corresponding to each group of array elements based on the at least two image data segments that are adjacent with respect to time.

The first flow velocity determination module 230 may be configured to determine a first flow velocity of one or more detection points. In some embodiments, the first flow velocity determination module 230 may determine at least one first flow velocity of the at least one detection point based on the parameter related to the phase change and a location relationship among the at least one detection point, at least one transmission point, and a plurality of receiving points. In some embodiments, the first flow velocity determination module 230 may determine the first flow velocity of the at least one detection point by GPU parallel computing.

In some embodiments, the first flow velocity determination module 230 may determine the first flow velocity of the at least one detection point by calculating a characteristic matrix for the plurality of array elements, respectively, and integrating the calculation results of the plurality of array elements based on the parameter related to the phase change and the location relationship among the at least one detection point, the at least one transmission point, and the plurality of receiving points.

In some embodiments, the first flow velocity determination module 230 may be configured to execute one or more of the following: determining a resultant spatial displacement vector corresponding to each group of array elements based on the location relationship among the at least one detection point, the at least one transmission point, and the plurality of receiving points; determining a first characteristic matrix corresponding to each group of array elements based on the resultant spatial displacement vector; and determining a first flow velocity of the at least one detection point based on the phase change rate of the at least one detection point corresponding to each group of array elements and the first characteristic matrix corresponding to each group of array elements.

In some embodiments, the first flow velocity determination module 230 may be configured to execute one or more of following: determining a first auxiliary calculation matrix corresponding to each group of array elements based on the phase change rate of the at least one detection point corresponding to each group of array elements and the resultant spatial displacement vector corresponding to each group of array elements; determining a second auxiliary calculation matrix corresponding to each group of array elements based on the first auxiliary calculation matrix corresponding to each group of array elements; obtaining a third auxiliary calculation matrix by accumulating the first auxiliary calculation matrix corresponding to each group of array elements; obtaining a fourth auxiliary calculation matrix by accumulating the second first auxiliary calculation matrix corresponding to each group of array elements; and determining the first flow velocity of the at least one detection point based on the third auxiliary calculation matrix and the fourth auxiliary calculation matrix.

In some embodiments, the first flow velocity determination module 230 may be configured to execute one or more of the following: determining a spatial displacement vector corresponding to each receiving point based on the location relationship among the at least one detection point, the at least one transmission point, and the plurality of receiving points; and determining the resultant spatial displacement vector corresponding to each group of array elements based on the spatial displacement vector corresponding to each receiving point and a weight corresponding to each receiving point. In some embodiments, the first flow velocity determination module 230 may obtain the resultant spatial displacement vector corresponding to each group of array elements by utilizing the weight of each receiving point in each array element and a weighted sum of the spatial displacement vector of each receiving point in each array element. In some embodiments, the weight corresponding to each receiving point may be determined based on a distance between each receiving point and at least one detection point.

The second flow velocity determination module may be configured to determine a second flow velocity of one or more detection points. In some embodiments, the second flow velocity determination module 240 may determine a time intensity gradient and/or a spatial intensity gradient of the at least one detection point based on the image data; and/or determine the second flow velocity of the at least one detection point based on the time intensity gradient and/or spatial intensity gradient of the at least one detection point.

The flow velocity calibration module 250 may be configured to obtain a target flow velocity by calibrating a flow velocity of one or more detection points. In some embodiments, the flow velocity calibration module 250 may obtain a target flow velocity of the at least one detection point by performing the velocity calibration based on the first flow velocity and/or the second flow velocity of the at least one detection point. In some embodiments, the flow velocity calibration module 250 may be configured to execute one or more of the following: determining a difference between the first flow velocity and the second flow of the at least one detection point; in response to that the difference is not greater than a threshold, determining the target flow velocity of the at least one detection point based on the first flow velocity and the second flow velocity of the at least one detection point; and in response to that the difference is greater than the threshold, determining a target flow velocity of at least one adjacent detection point adjacent to the at least one detection point, and interpolating the target flow velocity of the at least one adjacent detection point to obtain the target flow velocity of the at least one detection point.

FIG. 3 is a flowchart illustrating an exemplary process for determining a first flow velocity of at least one detection point according to some embodiments of the present disclosure.

In some embodiments, the process 300 may be executed by the scanning device 110 and/or the processing device 120. In some embodiments, the process 300 may be stored in a storage device, such as the storage device 150, when the flow velocity detection system 100 (e.g., the processing device 120) executes the program or instruction, the process 300 may be implemented. In some embodiments, the process 300 may be performed by one or more modules in FIG. 2. As shown in FIG. 3, the process 300 may include:

In 310, the image data (e.g., the image data of the target object) may be obtained. In some embodiments, the operation 310 may be performed by the image data obtaining module 210.

The image may be a carrier of visual information describing the target object. The image data may include data used to generate an image. In some embodiments, the image data obtaining module 210 may obtain the image data based on the scanning probe. Specifically, the scanning probe may transmit a scanning signal to the target object or any one part of the target object, receive one or more reflected signals from the target object or any one part of the target object, and further obtain the image data based on the one or more reflected signals.

In some embodiments, the target object may include a human body, an organ, a damaged part, a tumor, a body, an object, etc. For example, the target object may be one or more diseased tissues of the heart, the image may be a medical image of the one or more diseased tissues of the heart. As another example, the target object may be an obstacle during a flight of an aircraft, and the image may be a flight radar chart. As a further example, the target object may be a fluid, and the image may be a flow pattern diagram.

In some embodiments, the image format may include, but is not limited to, a Joint Photographic Experts Group (JPEG) image format, a tagged image file format (TIFF) image format, a Graphics Interchange Format (GIF) image format, a Kodak flash pix (FPX) image format, a digital imaging and communications in medicine (DICOM) image format, or the like.

In some embodiments, the image format may include, but is not limited to, an ultrasonic wave image and/or an electromagnetic wave image, etc. Corresponding to the type of image, the scanning probe may include but is not limited to, an ultrasonic wave probe or a radar probe, or one or more combinations thereof. In some embodiments, the scanning signal may include but is not limited to, an ultrasonic wave or an electromagnetic wave, or one or more combinations thereof. In some embodiments, the reflected signal may include but is not limited to, an ultrasonic wave reflected signal or an electromagnetic wave reflected signal, or one or more combinations thereof.

In some embodiments, the image data corresponding to the electromagnetic wave image may be data obtained by scanning under a mode B. In some embodiments, the image data corresponding to the electromagnetic wave image may be a two-dimensional ultrasonic wave image in which an amplitude of an ultrasonic wave reflection signal corresponding to a single ultrasonic transmission is expressed by brightness.

In some embodiments, the scanning probe may include an array element. The array element may be an assembly on the scanning probe configured to transmit the scanning signal(s) and/or receive the reflected signal(s).

Figure 4A:
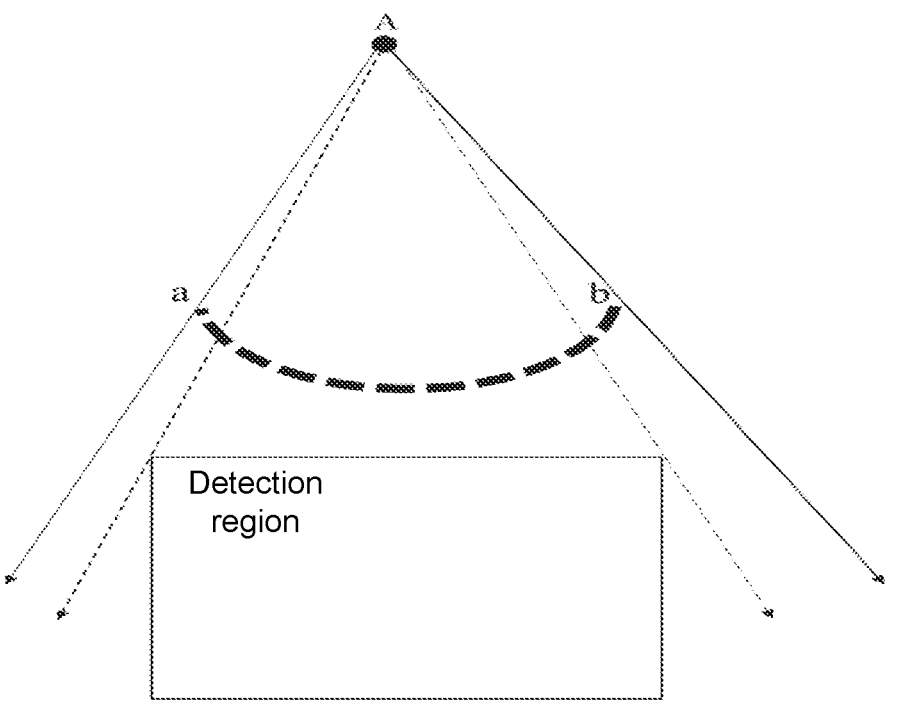
FIG. 4a is a schematic diagram illustrating an exemplary divergent wave according to some embodiments of the present disclosure.
Figure 4B:
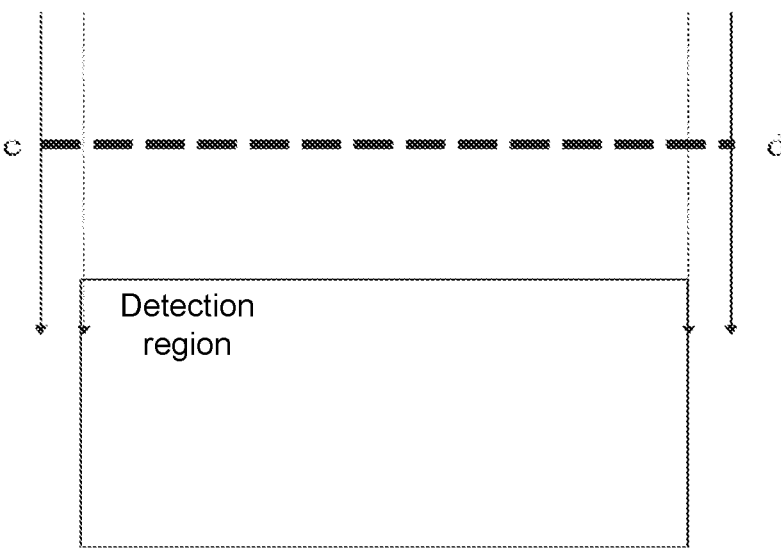
FIG. 4b is a schematic diagram illustrating an exemplary plane wave according to some embodiments of the present disclosure.

In some embodiments, according to the arrangement of array elements on the scanning probe, the scanning probe may include a linear array probe, a convex array probe, or a phased array probe, or one or more combinations thereof. The array elements of the linear array probe, the convex array probe, and/or the phased array probe may be arranged into a straight line segment (as shown in FIG. 4a), an arc segment (as shown in FIG. 4b), and/or a square matrix (not shown), respectively.

In some embodiments, the array element of the scanning probe may include piezoelectric material, for example, the array element of the ultrasonic probe and/or the radar probe may be barium titanate, lead titanate, lead zirconate titanate, or the like.

In some embodiments, the scanning probe may include array elements with multiple frequencies and control circuits corresponding to each array element, and the scanning probe may generate different scanning signals with different frequencies by exciting the array elements at different positions using a pulse signal.

For example, an ultrasonic scanning probe may transmit the signal to the target object or a portion thereof by converting an electric signal pulse into an ultrasonic signal through the array element, and/or converting the reflected ultrasonic signal of the target object or a portion thereof into an electric signal (i.e., image data).

In some embodiments, each control circuit may excite an array element. Specifically, the scanning probe may transmit each pulse signal to the corresponding control circuit, and each control circuit excites a corresponding array element based on the pulse signal, and thus scanning signals with different or the same frequencies may be emitted at different time points or at the same time.

In some embodiments, the image data obtaining module 210 may obtain the image data by utilizing full array element (also referred to as full aperture) transmission.

The full aperture transmission may be a transmission mode for transmitting the scanning signal by utilizing all array elements of the scanning probe. It should be understood that the image data obtaining module 210 may obtain an image frame corresponding to all detection regions (i.e., the target object or a portion thereof) based on a signal full aperture transmission. In some embodiments, the image data obtaining module 210 may obtain an image sequence (or video) corresponding to the detection region (i.e., the target object or a portion thereof).

In some embodiments, the full aperture transmission may include a full aperture transmission under an unfocused wave transmission mode (e.g., a divergent wave transmission mode and/or a plane wave transmission mode).

The divergent wave transmission mode may be a transmission mode in which a focus is above the scanning probe during the transmission. As shown in FIG. 4a, a focus A may be above the scanning probe when transmitting the divergent wave, and all the array elements a-b above the scanning probe may transmit the scanning signal(s). The plane wave transmission mode may be a transmission mode with the focus at infinity during the transmission. As shown in FIG. 4b, the focus may be at infinity when transmitting the plane wave, and all the array elements above the scanning probe c-d may transmit the scanning signal.

In some embodiments, the image data obtaining module 210 may divide the plurality of full aperture transmission into a plurality of transmission groups under the divergent wave transmission mode, and each transmission group may include at least two adjacent full aperture transmissions. In some embodiments, a focus position corresponding to the full aperture transmission in each transmission group may be the same.

For example, the image data obtaining module 210 may divide the 40 full aperture transmissions into 20 transmission groups under the divergent wave mode, and each transmission group may include two adjacent full aperture transmissions; the first transmission group may include a first full aperture transmission and a second full aperture transmission, and focus positions corresponding to the first full aperture transmission and the second full aperture transmission may be both the position of the first focus; the second transmission group may include a third full aperture transmission and a fourth full aperture transmission, and focus positions corresponding to the third full aperture transmission and the fourth full aperture transmission may be both the position of the second focus; . . . ; and the $20^{th}$ transmission group may include a $39^{th}$ full aperture transmission and a $40^{th}$ full aperture transmission, and focus positions corresponding to the $39^{th}$ full aperture transmission and the $40^{th}$ full aperture transmission may be both the position of the $20^{th}$ focus.

In some embodiments, the image data obtaining module 210 may obtain the plurality of array elements by grouping the array elements of the scanning probe, wherein each group of array elements of the plurality of array elements may include one or more array elements.

Figure 5A:
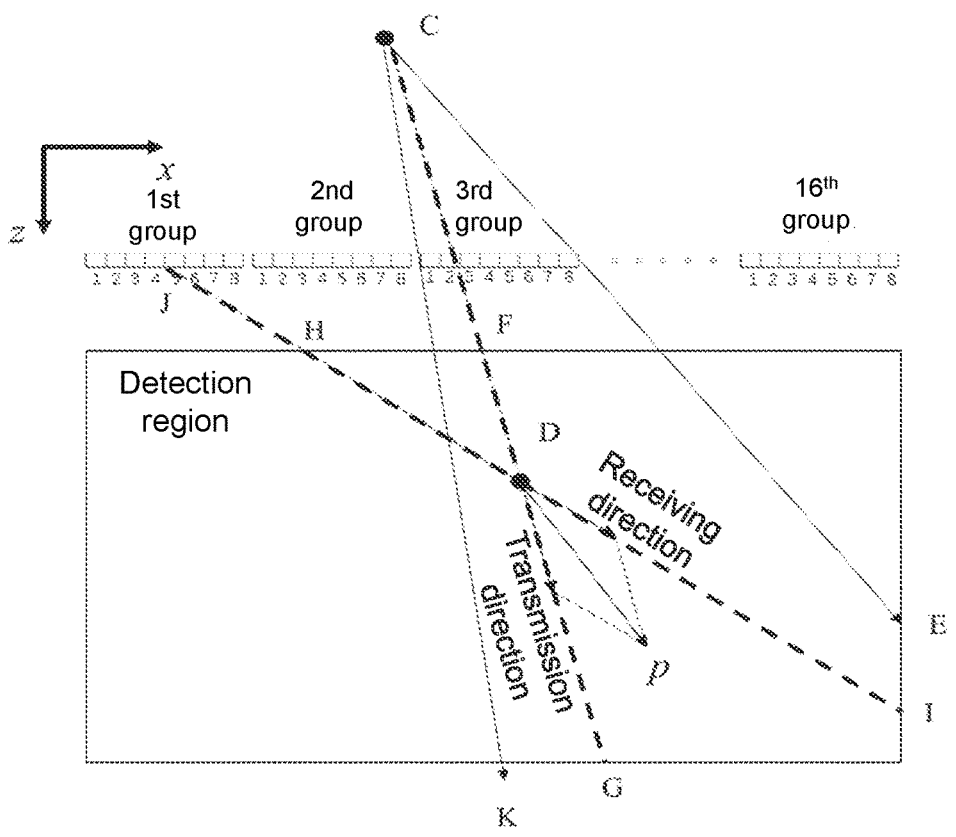
FIG. 5a is a schematic diagram illustrating an exemplary full aperture transmission under a divergent wave mode according to some embodiments of the present disclosure.

In some embodiments, each group of array elements may include the same count of array elements. For example, as shown in FIG. 5a, the image data obtaining module 210 may divide the 128 array elements of the scanning probe into 16 groups of array elements, and each group of array elements may include 8 array elements.

In some embodiments, the counts of array elements included in any two groups of array elements may be different. For example, the image data obtaining module 210 may reduce the count of array elements in the array element group corresponding to a region of non-interest, and increase the count of array elements in the array element group corresponding to a region of interest. For example, a center position of the detection region may be the region of interest, and two sides of the detection region may be the region of non-interest, then the image data obtaining module 210 may divide the 128 array elements of the scanning probe into 8 groups of array elements, and the count of array elements in the 9 groups of array elements may be 8, 8, 8, 8, 16, 16, 16, 16, 8, 8, 8, 8, respectively.

In some embodiments, the image data may include a plurality of image data. Each group of image data in the plurality of image data may correspond to a group of array elements in the plurality of array elements.

In some embodiments, the array element group corresponding to each group of image data may be an array element group receiving the reflected signal corresponding to the group of image data. As shown in FIG. 5a, based on the scanning signal transmitted by a third group of array elements, a first group of array elements may receive the corresponding reflected signal. The image data obtaining module 210 may generate a group of image data (e.g., the first group of image data) based on the reflected signal received by the first group of array elements, the first group of array elements may be the array group corresponding to the group of image data. Similarly, a second group of array elements, a third group of array elements, . . . , and a $16^{th}$ group of array elements may correspond to a second group of image data, a third group of image data, . . . , and a $16^{th}$ group of image data, respectively.

In some embodiments, each group of image data corresponding to each group of array elements may correspond to an image region (e.g., a part of image). As shown in FIG. 5a, the image data obtaining module 210 may generate a first image region (e.g., an image of the detection region within a CK range and a CE range) based on the first group of image data. Similarly, the image data obtaining module 210 may generate a second image region, a third image region, . . . , and a $16^{th}$ image region based on the second group of image data, the third group of image data, . . . , and the $16^{th}$ group of image data, respectively. In some embodiments, the first image region, the second image region, the third image region, . . . , and the $16^{th}$ image region may be different from each other to form the detection region. It should be understood that the image data obtaining module 210 may spatially divide the image data corresponding to the detection region into the plurality of groups of image data corresponding to the plurality of image regions based on the array element grouping.

In some embodiments, each group of image data may be obtained by performing demodulation and/or beam synthesis on the reflected signals received by a corresponding group of array elements.

The demodulation may be a process of restoring a digital band signal to a digital baseband signal.

The beam synthesis may be a process of weighted synthesis of multiple reflected signals. In some embodiments, the image data obtaining module 210 may perform the weighted synthesis on the reflected signals received by two or more array elements in each array element group, and further determine the image data group corresponding to the plurality of reflected signals received by the array element group.

For example, the image data obtaining module 210 may generate the first group of image data, the second group of image data, . . . , and the $16^{th}$ group of image data based on the reflected signals received by the first group of array elements, the second group of array elements, . . . , and the $16^{th}$ group of array elements, respectively.

In 320, a parameter of at least one detection point may be determined based on the image data. The parameter may be related to a phase change. In some embodiments, the operation 310 may be performed by the parameter determination module 220.

The detection point may be a space point on the detection region (i.e., the target object or a portion thereof). As shown in FIG. 5a, the detection point may be a space point D on the detection region.

The parameter related to the phase change may be a parameter representing a time-varying phase of the reflected signals returning from the detection point. In some embodiments, the parameter related to the phase change may include a phase change rate.

The phase change rate may be a phase change of the reflected signals returned from the detection point per unit time. It should be understood that the reflected signals may be affected by the direction of the scanning signals and/or a motion of the detection point. Therefore, in order to obtain a moving speed of the detection point based on the phase change rate, the phase change rate may be a phase change of the reflected signals corresponding to the scanning signals in a same direction per unit time. In some embodiments, the direction of the scanning signals may be determined based on the position of the transmission point. In some embodiments, the same scanning signals may correspond to the same focus.

For example, the phase change rate of the focus under the plane wave mode at infinity may be a phase change of the reflected signals corresponding to scanning signals obtained by any two adjacent transmissions per unit time.

As another example, the phase change rate under the divergent wave mode may be a phase change of the reflected signals corresponding to scanning signals obtained by any two adjacent transmissions in a same transmission group per unit time. For example, the phase change rate may be a phase change of the reflected signals corresponding to the first full aperture transmission and the second full aperture transmission in the first transmission group per unit time, wherein the focus positions of the first full aperture transmission and the second full aperture transmission may both be position of a point C.

In some embodiments, the parameter determination module 220 may determine, in the image data, at least two image data segments that are adjacent with respect to the time received by each group of array elements.

The image data segment may be a part of image data corresponding to each image frame.

In some embodiments, the processing device may generate an image frame based on the image data corresponding to a scanning signal transmitted by the scanning probe, and generate an image based on the plurality of image frames. For example, under the full aperture transmission mode of the scanning probe, each image frame may be obtained based on the image data corresponding to a scanning signal, and each image may be obtained based on 40 image frames. For example, under the full aperture transmission mode, a first image frame, a second image frame, . . . , and a $40^{th}$ image frame may be generated based on a first scanning signal, a second scanning signal, . . . , and a $40^{th}$ scanning signal, respectively. Further, based on a transmission sequence of the scanning signal corresponding to each image frame, the image may be obtained by compositing the first image frame, the second image frame, . . . , and the $40^{th}$ image frame.

Figure 6:
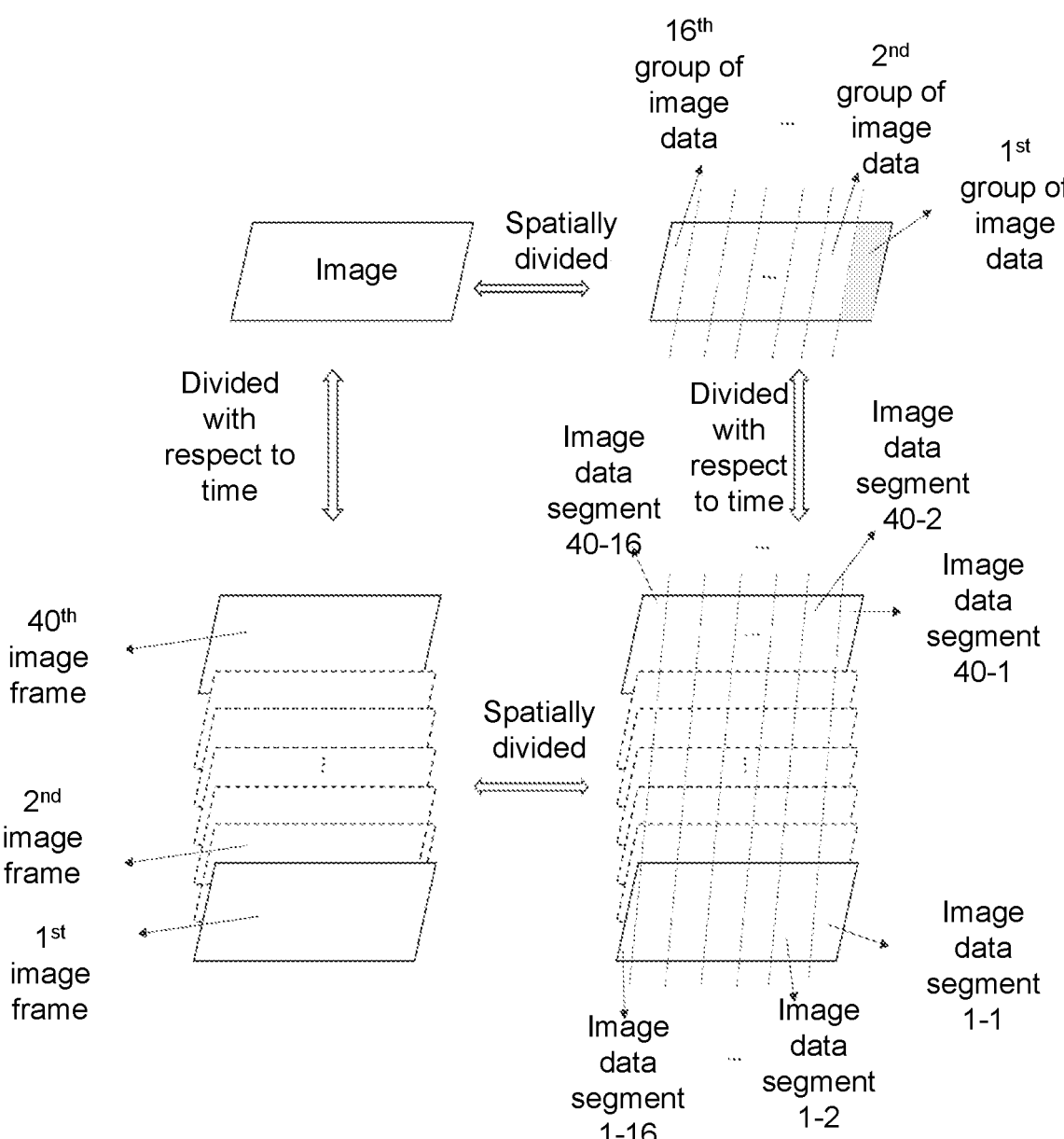
FIG. 6 is a schematic diagram illustrating exemplary image data according to some embodiments of the present disclosure.

As set forth above, each group of image data corresponding to each group of array elements may correspond to an image region, further, based on the plurality of image regions corresponding to the plurality of array elements, the parameter determination module 220 may divide the image data corresponding to each image frame into a plurality of image data segments. As shown in FIG. 6, the image data corresponding to the first image frame may be divided into a corresponding image data segment 1-1 (i.e., a first image data segments of the first frame image), an image data segment 1-2 (i.e., a second image data segment of the first frame image), . . . , and an image data segment 1-16 (i.e., a $16^{th}$ image data segment of the first frame image) based on the first image region, the second image region, . . . , and the $16^{th}$ image region; the image data corresponding to the $40^{th}$ image frame may be divided into a corresponding image data segment 40-1 (i.e., a first image segment of the $40^{th}$ frame image), an image data segment 40-2 (i.e., a second image segment of the $40^{th}$ frame image), . . . , and an image data segment 40-16 (i.e., a $16^{th}$ image segment of the $40^{th}$ frame image) based on the first image region, the second image region, . . . , and the $16^{th}$ image region.

It should be understood that each image data segment may spatially correspond to a part of the image data corresponding to each image frame and correspond to a part of each group of image data with respect to the time.

In some embodiments, the plurality of image frames may be obtained by compositing the plurality of image data segments based on a spatial relationship firstly, and the image data of the detection region may be obtained based on a time relationship. As shown in FIG. 6, the image data of the detection region corresponding to the first frame may be obtained based on the image data of 16 image regions corresponding to the first image frame. Similarly, the image data of the whole detection region corresponding to the $40^{th}$ image frame may be obtained based on the image data of the 16 image regions corresponding to the first image frame. Further, the image data of the whole detection region may be obtained based on the 40 image frames (each image frame may correspond to the image data of the whole detection region).

In some embodiments, a plurality of image data may be obtained by compositing the plurality of image data segments based on a time relationship firstly, and the image data of the detection region may be obtained based on the spatial relationship. As shown in FIG. 6, the first group of image data corresponding to the first image region may be obtained based on the first image data segment of each image frame in the 40 image frames corresponding to the first image region. Similarity, the $16^{th}$ group of image data corresponding to the $16^{th}$ image data may be obtained based on the $16^{th}$ image data segment of each image frame in the 40 image frames corresponding to the $16^{th}$ image region. Further, the image data of the whole detection region may be obtained based on the 16 groups of image data of the 16 image regions.

In some embodiments, the at least two image data segments that are adjacent with respect to the time received by each group of array elements may be at least two image data segments of scanning signals that are obtained by adjacent transmissions at the same focus position and received by each group of array elements. For example, at least two image data segments that are adjacent with respect to time and correspond to the same focus position, which are received by each group of array elements may be two consecutive image data segments corresponding to the scanning signals in the same transmission group under the divergent wave transmission mode, such as a first image data segment $I_1^2$ and a second image data segment $I_1^2$ received by the first group of array elements when the transmission focus is at the point C. As another example, the at least two image data segments that are adjacent with respect to the time received by each group of array elements may be consecutive multiple image data segments under the plane wave transmission mode, such as the second image data segment $I_1^2$ a third image data segment $I_1^3$, and a fourth image data segment $I_1^4$ received by the first group of array elements.

In some embodiments, the parameter determination module 220 may determine the phase change rate of the at least one detection point corresponding to each group of array elements based on the at least two image data segments that are adjacent with respect to the time.

As set forth above, each group of image data may correspond to a part of image of the detection region (i.e., an image region), each image data segment may include the image data of the at least one detection point. As shown in FIG. 5a, the image data segment (or image data group) corresponding to the first group of array elements may include the image data of the detection point within a CK range and a CE range.

In some embodiments, the parameter determination module 220 may determine a phase change rate of the at least one detection point of each group of array elements based on the at least two image data segments that are adjacent with respect to the time by Equation (1):

$$\dot{\phi}_k \approx \frac{\arg I_k^{i+1} I_k^i}{t_k^{i+1} - t_k^i},\tag{1}$$

Wherein $\dot{\phi}_k$ represents a phase change rate of the at least one detection point received by the $K^{th}$ group of array elements; $I_k^{i+1}$ and $I_k^i$ represent $(i+1)^{th}$ and $i^{th}$ image data segments received by the $K^{th}$ group of array elements on the scanning signal corresponding to the same focus; $t_k^{i+1}$ and $t_k^i$ represent transmission time of the scanning signals corresponding to the $(i+1)^{th}$ and $i^{th}$ image data segments received by the $K^{th}$ group of array elements.

For example, the second frame and the first image data segment received by the first group of array elements based on the scanning signal corresponding to the same focus C may be $I_1^2$ and $I_1^1$, respectively, during a transmission time interval of the scanning signal corresponding to the second frame and the first image data segment received by the first group of array elements, the phase change rate of the at least one detection point received by the first group of array elements may be $\dot{\phi}_1$.

Similarly, the parameter determination module 220 may determine the plurality of phase change rates of the at least one detection point of each group of array elements based on the plurality of image data segments that are adjacent with respect to the time. Specifically, the parameter determination module 220 may obtain the corresponding plurality of phase change rates based on any two adjacent image data segments in the plurality of image data segments that are adjacent with respect to the time according to Equation (1), and further, obtain a final phase change rate based on the plurality of phase change rates. In some embodiments, the parameter determination module 220 may obtain a final phase change rate by calculating an average, a weighted average, or a variance, of the plurality of phase change rates.

For example, for the second image data segment $I_1^2$, the third image data segment $I_1^3$, and the fourth image data segment $I_1^4$ received by the first group of array elements based on the scanning signals of the same transmission focus, the parameter determination module 220 may obtain a phase change rate $\dot{\phi}_1^{2,3}$ based on the second image data segment $I_1^2$ and the third image data segment $I_1^3$, obtain a phase change rate $\dot{\phi}_1^{3,4}$ based on the third image data segment $I_1^3$ and the fourth image data segment $I_1^4$, calculate an average of the phase change rate $\dot{\phi}_1^{2,3}$ and the phase change rate $\dot{\phi}_1^{3,4}$, and obtain the phase change rate $\dot{\phi}_1$ of the at least one detection point of the first group of array elements.

In 330, a first flow velocity of the at least one detection point may be determined based on the parameter related to the phase change and the location relationship among the at least one detection point, the at least one transmission point, and the plurality of receiving points.

In some embodiments, the operation 330 may be performed by the first flow velocity determination module 230.

The transmission point may be any array element in the array element group that transmits the scanning signal to the detection point. As shown in FIG. 5a, a second array element in the third group of array elements that transmits the scanning signal to a detection point D may be a transmission point 3-2 corresponding to the detection point D.

The receiving point may be any array element in the array element group that receives the reflected signals from the detection point. As shown in FIG. 5a, the fifth array element in the first group of array elements that receives the scanning signal from the detection point D may be a receiving point 1-5 corresponding to the detection point D.

The first flow velocity may be the flow velocity of the detection point determined based on the phase change of the reflected signals.

In some embodiments, the first flow velocity determination module 230 may obtain the first flow velocity of the at least one detection point by calculating a characteristic matrix for the plurality of groups of array elements, respectively, and integrating the calculation results of the plurality of groups of array elements based on the parameter related to the phase change and the location relationship among the at least one detection point, the at least one transmission point, and the plurality of receiving points.

More descriptions about the process of obtaining the first flow velocity may be referred to FIG. 7 and the related descriptions, which may not be repeated here.

FIG. 7 is a schematic diagram illustrating an exemplary process of determining a first flow velocity of at least one detection point based on a parameter related to phase change and a location relationship among the at least one detection point, at least one transmission point, and a plurality of receiving points according to some embodiments of the present disclosure. In some embodiments, the process 700 may be performed by the scanning device 110 and/or the processing device 120. For example, the process 700 may be implemented as a set of instructions (e.g., an application) stored in a storage device (e.g., the storage device 150). In some embodiments, the flow velocity detection system 100 (e.g., the processing device 120) may execute the set of instructions and may accordingly be directed to perform the process 700. In some embodiments, the process 700 may be accomplished with one or more additional operations not described and/or without one or more of the operations discussed. Additionally, the order of the operations of process 700 illustrated in FIG. 7 and described below is not intended to be limiting.

In 710, a resultant spatial displacement vector corresponding to each group of the array elements may be determined based on the location relationship among the at least one detection point, the at least one transmission point, and the plurality of receiving points.

In some embodiments, each transmission point may transmit a scanning signal to the at least one detection point. Specifically, each transmission point may transmit the scanning signal(s) to the detection point in a corresponding transmission direction in the detection region.

Figure 5B:
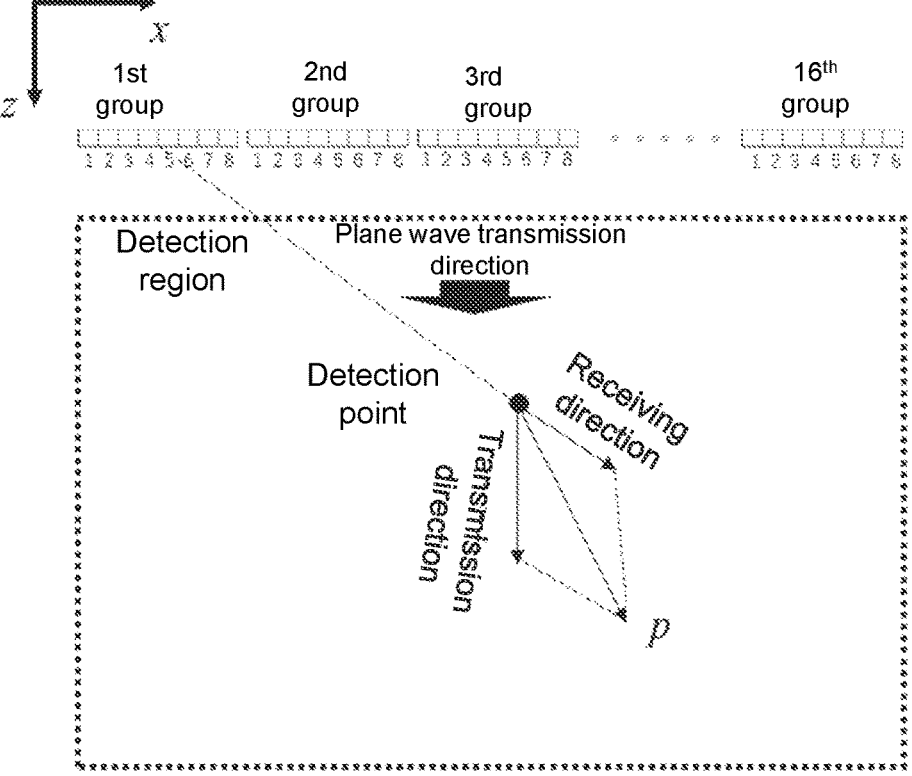
FIG. 5b is a schematic diagram illustrating an exemplary full aperture transmission under a plane wave mode according to some embodiments of the present disclosure.

In some embodiments, the transmission direction of each transmission point may be determined based on the corresponding focus position when the transmission point transmits the scanning signal. For example, the transmission direction may be directed from the focus position to the position of the transmission point. As shown in FIG. 5a, a transmission direction of a transmission point 3-2 (i.e., a second array element of the third group of array elements) may be directed from the transmission point C to the detection point D (i.e., a $\overrightarrow{CD}$ direction), the transmission point 302 may transmit the scanning signal to a detection point (i.e., a detection point on line segment FG) on the $\overrightarrow{CD}$ direction in the detection region under the divergent wave mode. As shown in FIG. 5b, the transmission direction of the transmission point under the plane wave mode may be a vertical direction.

In some embodiments, each receiving point may receive a reflected signal obtained based on the scanning signal of the at least one detection point from the at least one detection point. Specifically, each receiving point may receive the reflected signal from the detection point in a corresponding receiving direction in the detection region. In some embodiments, the receiving direction of each receiving point may be determined based on positions of the receiving point and detection point. For example, the receiving direction may be directed from the position of the receiving point to the position of the detection point. As shown in FIG. 5a, a receiving direction of a receiving point 1-5 (i.e., a fifth array element of the first group of array elements) may be directed from position J of the receiving point 1-5 to the detection point D (i.e., a $\overrightarrow{JD}$ direction), and the receiving point 1-5 may receive the reflected signal from the detection point on the $\overrightarrow{JD}$ direction in the detection region.

A resultant spatial displacement vector corresponding to each group of the array elements may be a unit flow velocity of the at least one detection point detected by each group of array elements, which may represent a flow velocity direction of the at least one detection point detected by each group of array elements. In some embodiments, the resultant spatial displacement vector corresponding to each group of the array elements may be a resultant vector of the spatial displacement vectors corresponding to all the array elements (i.e., the receiving point) in each group of array elements.

In some embodiments, the first flow velocity determination module 230 may determine the spatial displacement vector corresponding to each receiving point based on the location relationship among the at least one detection point, the at least one transmission point, and/or the plurality of receiving points.

The spatial displacement vector of a detection point corresponding to the receiving point may be a resultant vector of unit vectors of the detection point in the receiving direction and unit vectors of the detection point in the transmission direction. As shown in FIG. 5a, a spatial displacement vector of the detection point D corresponding to the receiving point 1-5 may be a unit vector of the detection point D in the receiving direction $\overrightarrow{JD}$ and a resultant vector $\overrightarrow{p}$ of the unit vector in the transmission direction $\overrightarrow{CD}$.

In some embodiments, the first flow velocity determination module 230 may determine a spatial displacement vector of a detection point corresponding to each receiving point based on Equation (2):

$$p_k^m = \nabla |x - x^T| + \nabla |x - x_{k,m}^R| = \frac{x - x^T}{|x - x^T|} + \frac{x - x_{k,m}^R}{|x - x_{k,m}^R|}, \tag{2}$$

Wherein $p_k^m$ represents a spatial displacement vector of a detection point corresponding to an $m^{th}$ array element (i.e., an $m^{th}$ receiving point) in the $k^{th}$ group of receiving array elements; x represents the position of the detection point; $x^T$ represents position of the transmission point; and $x_{k,m}^R$ represents the position of the $m^{th}$ array element in the $k^{th}$ group of receiving array elements.

Further, in some embodiments, the first flow velocity determination module 230 may determine the resultant spatial displacement vector corresponding to each group of array group based on the spatial displacement vector corresponding to each receiving point and the weight corresponding to each receiving point.

The weight corresponding to each receiving point may represent importance of each receiving point to the at least one detection point. In some embodiments, for the different detection points, the weight of each receiving point may be different.

In some embodiments, the weight of each receiving point may be determined based on a distance between each receiving point and the at least one detection point.

In some embodiments, the weight of each receiving point may be positively correlated with the distance between each receiving point and the at least one detection point. For example, the closer the receiving point is to a certain detection point, the smaller the weight of the receiving point relative to the detection point. As shown in FIG. 5a, the closer a receiving point 1-1, a receiving point 1-5, . . . , or a receiving point 2-5 to the detection point, the smaller the weight of the receiving point 1-1, the receiving point 1-5, . . . , or the receiving point 2-5.

In some embodiments, the first flow velocity determination module 230 may determine the weight of each receiving point based on the distance between each receiving point and the detection point. For example, the first flow velocity determination module 230 may take a ratio of the distance between each receiving point and the detection point and a sum of the distances between all the receiving points and the detection point as the weight of each receiving point. For example, the distance between the detection point D and the receiving point 1-1, the distance between the detection point D and the receiving point 1-2, . . . , and the distance between the detection point D and the receiving point 16-8, may be 20 mm, 25 mm, . . . 50 mm, respectively, and a sum of the distances may be 3840 mm; and the weight of the receiving point 1-1, the receiving point 1-2, . . . , and the receiving point 16-8 may be 20/3840=0.0052, 25/3840=0.0065, . . . , and 50/3840=0.0130, respectively.

The embodiments of the present disclosure may set the weight of each receiving point to be positively related to the distance between each receiving point and the at least one detection point, which may improve the resolution of the image.

In some embodiments, the weight of each receiving point may be negatively correlated with the distance between each receiving point and the at least one detection point. For example, the closer the receiving point is to a certain detection point, the greater the weight of the receiving point relative to the detection point. As shown in FIG. 5a, the closer the receiving point 1-1, the receiving point 1-5, . . . , or the receiving point 2-5 to the detection point, the greater the weight of the receiving point 1-1, the receiving point 1-5, . . . , or the receiving point 2-5.

In some embodiments, the first flow velocity determination module 230 may determine the weight of each receiving point based on a reciprocal value of the distance between each receiving point and the detection point. For example, the first flow velocity determination 230 may determine a ratio of a reciprocal value of the distance between each receiving point and the detection point to a sum of the reciprocal values of the distances between all the receiving points and the detection point. For example, the distance between the detection point D and the receiving point 1-1, the distance between the detection point D and the receiving point 1-2, . . . , and the distance between the detection point D and the receiving point 16-8, may be 20 mm, 25 mm, . . . 50 mm, respectively, a corresponding reciprocal value of the distance may be 0.05, 0.04, . . . , 0.02, respectively, a sum of the reciprocal values of the distance may be 3.2; and the weight of the receiving point 1-1, the receiving point 1-2, . . . , the receiving point 16-8 may be 0.05/3.2=0.015625, 0.04/3.2=0.0125, . . . , 0.02/3.2=0.00625, respectively.

The embodiments of the present disclosure may set the weight of each receiving point to be negatively correlated with the distance between each reception point and the at least one detection point, which can reduce artifacts of the image.

In some embodiments, the first flow velocity determination module 230 may determine, using the weight of each receiving point in each group of the array elements, a weighed sum of the spatial displacement vector of each receiving point in each group of the array elements to obtain the resultant spatial displacement vector corresponding to each group of the array elements.

In some embodiments, the first flow velocity determination module 230 may determine the resultant spatial displacement vector corresponding to each group of the array elements by a formula (3):

$$p_k = \frac{\sum_k \omega_k^m p_k^m}{\sum_k \omega_k^m}, \tag{3}$$

Wherein $p_k$ represents a resultant spatial displacement vector of the $k^{th}$ group of array elements; $\omega_k^m$ represent a weight of the $m^{th}$ receiving point of the $k^{th}$ group of array elements; and $p_k^m$ represents a spatial displacement vector of the $m^{th}$ receiving point of the $k^{th}$ group of array elements.

Further regarding the above example, the first flow velocity determination module 230 may determine the resultant spatial displacement vector $p_1$ corresponding to the first group of array elements based on the spatial displacement vectors $p_1{}^1$, $p_1{}^2$, . . . , $p_1{}^{16}$ and the weights $\omega_1{}^1$, $\omega_1{}^2$, . . . , $\omega_1{}^{16}$ of the detection point D corresponding to the receiving point 1-1, the receiving point 1-2, . . . , the receiving point 1-16 in the first group of array elements. Similarly, the first flow velocity determination module 230 may determine the resultant spatial displacement vectors $p_2$, $p_3$, . . . , $p_{16}$ of the detection point D corresponding to the second group of array elements, the third group of array elements, . . . , and the $16^{th}$ group of array elements, respectively.

In 720, a first characteristic matrix corresponding to each group of array elements may be determined based on the resultant spatial displacement vector corresponding to each group of the array elements.

The first characteristic matrix corresponding to each group of array elements may be a matrix obtained based on components of the phase change of the reflected signals corresponding to the two adjacent scanning signals received by each group of array elements on horizontal and vertical directions in a waveform diagram coordinate system of the reflected signals.

In some embodiments, the first flow velocity obtaining module 230 may determine components of unit phase change rate along the X-axis and Z-axis, respectively, based on the resultant spatial displacement vector corresponding to each group of the array elements. The X-axis and the Z-axis may be parallel to the horizontal and vertical direction of the detection region, respectively.

Specifically, the first flow velocity obtaining module 230 may obtain the first characteristic matrix corresponding to each group of array elements based on Equation (4):

$$a = \left[ \frac{\partial \phi_k}{\partial x} = \frac{\omega_0}{c} p_{kx}^T \quad \frac{\partial \phi_k}{\partial z} = \frac{\omega_0}{c} p_{kz}^T \right], \tag{4}$$

Wherein $$\frac{\partial \phi_k}{\partial x} \text{ and } \frac{\partial \phi_k}{\partial z}$$

represent components of the unit phase change rate along the X-axis and Z-axis corresponding to the $k^{th}$ group of array elements, respectively; $\omega_0$ represents an angular frequency of transmission pulse; c represents a speed of the scanning signal; and $p_{kx}{}^T$ and $p_{kz}{}^T$ represent components of a transposition matrix $p^T$ of the resultant spatial displacement vector of the $k^{th}$ group of array elements along the X-axis and Z-axis, respectively, which may be determined based on the location relationship among the at least one detection point, the at least one transmission point, and the plurality of receiving points.

In 730, the first flow velocity of the at least one detection point may be determined based on the phase change rate of the at least one detection point corresponding to each group of array elements and/or the first characteristic matrix corresponding to each group of the array elements.

In some embodiments, a relationship between the first flow velocity of the at least one detection point and the phase change rate may represent by Equation (5):

$$\dot{\phi} = \frac{\omega_0}{c} p^T v, \tag{5}$$

Wherein $\dot{\phi}$ represents the phase change rate; v represents the first flow velocity of the at least one detection point; and $p^T$ represents the transposition matrix of the resultant spatial displacement vector.

In some embodiments, the first flow velocity v may be decomposed into a component $v_x$ along the horizontal axis and a component $v_z$ along the vertical axis, a right end of the formula (5) may be decomposed into a product of the first matrix and the first flow velocity along the horizontal axis is based on Equation (6):

$$\dot{\phi}_k = \left[ \frac{\partial \phi_k}{\partial x} \quad \frac{\partial \phi_k}{\partial z} \right] \binom{v_x}{v_z}, \tag{6}$$

In order to facilitate the calculation, let $$a = \left[ \frac{\partial \phi_k}{\partial x} \quad \frac{\partial \phi_k}{\partial z} \right], \text{ and } b = \dot{\phi}_k,$$

and the formula (6) may be simplified to Equation (7):

$$a_k v = b_k, \tag{7}$$

In some embodiments, the first flow velocity determination module 230 may determine a first auxiliary calculation matrix corresponding to each group of the array elements based on the phase change rate of the at least one detection point corresponding to each group of array elements and/or the first characteristic matrix corresponding to each group of the array elements.

In some embodiments, the first auxiliary calculation matrix may be a product of the transposition matrix of the first characteristic matrix of each array element and the phase change rate $a_k{}^T b_k$.

In some embodiments, the first flow velocity determination module 230 may determine a second auxiliary calculation matrix corresponding to each group of array elements based on the first characteristic matrix corresponding to each group of the array elements. In some embodiments, the second auxiliary calculation matrix may be a product of the transposition matrix of the first characteristic matrix of each group of array elements and the first characteristic matrix $a_k{}^T a_k$.

In some embodiments, the first flow velocity determination module 230 may obtain a third auxiliary calculation matrix by accumulating the first auxiliary calculation matrix corresponding to each group of array elements. Specifically, the third auxiliary calculation matrix may be determined based on Equation (8):

$$A^T B = \sum_k a_k^T b_k, \tag{8}$$

In some embodiments, the first flow velocity determination module may obtain a fourth auxiliary calculation matrix by accumulating the second auxiliary calculation matrix corresponding to each group of the array elements. Specifically, the fourth auxiliary calculation matrix may be determined based on Equation (9):

$$A^T A = \sum_k a_k^T a_k, \tag{9}$$

In some embodiments, the first flow velocity determination module 230 may determine the first flow velocity of the at least one detection point based on the third auxiliary calculation matrix and the fourth auxiliary calculation matrix.

In some embodiments, the first flow velocity may be determined based on Equation (10):

$$v = (A^T A)^{-1}(A^T b), \tag{10}$$

In some embodiments, the first flow velocity determination module 230 may determine the first flow of the at least one detection point by the GPU parallel computing.

Specifically, the GPU may parallel calculate the phase change rate, the resultant spatial displacement vector, the first characteristic matrix, and the first auxiliary calculation matrix corresponding to each group of array elements, etc., which can improve the computational efficiency.

FIG. 8 is a flowchart illustrating an exemplary process of determining a second flow velocity of at least one detection point according to some embodiments of the present disclosure. In some embodiments, the process 800 may be performed by the scanning device 110 and/or the processing device 120. For example, the process 800 may be implemented as a set of instructions (e.g., an application) stored in a storage device (e.g., the storage device 150). In some embodiments, the flow velocity detection system 100 (e.g., the processing device 120) may execute the set of instructions and may accordingly be directed to perform the process 800. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, a time intensity gradient and/or a spatial intensity gradient of the at least one detection point may be determined based on the image data.

An optical flow field may be a projection image of a movement field on a two-dimensional plane. It should be understood that the movement field may be used to describe the movement, and the optical field may reflect grayscale distribution of different projection images in the projection image sequence, and thus the movement field of the three-dimensional space may be transferred to the two-dimensional plane. Therefore, the optical flow field may correspond to the movement field in an ideal state.

The optical flow may be an instantaneous movement speed of the projection point corresponding to the detection point on the projection image. In some embodiments, the optical flow may be represented by a changing trend of the grayscale value of pixels in the optical flow field. The length and direction of the arrows in the optical flow field may respectively characterize the size and direction of the optical flow at each point.

In some embodiments, the second flow velocity determination module 240 may obtain the optical flow field based on the image data. Specifically, the second flow velocity determination module 240 may obtain the optical flow filed by determining all the optical flow based on a change of the grayscale value of all the pixels in the plurality of consecutive image frames.

In some embodiments, the second flow velocity determination module 240 may determine a time intensity gradient and/or a spatial intensity gradient of the at least one detection point based on the optical flow field.

The time intensity gradient may be the grayscale value of pixels in the optical flow field based on a rate of time change, which may be represented by a partial derivative of the pixel in the projection image with respect to the time (t) direction.

In some embodiments, the second flow determination module 240 may determine the time intensity gradient of the at least one detection point based on Equation (11):

$$\check{I} = \frac{\partial I}{\partial t}, \tag{11}$$

Wherein $\check{I}$ represents the time intensity gradient of the at least one detection point, I represents the optical flow field, and t represents a time interval of a plurality of optical flow field frames that form the optical flow field.

The spatial intensity gradient may be a gradient of a grayscale value of pixels in the optical flow field based on the position change, which may be represented by partial derivatives of pixels in the projection image along the X-axes and Z-axes. In some embodiments, the second flow velocity determination 240 may determine the spatial intensity gradient of the at least one detection point based on Equation (12):

$$\nabla I = \frac{\partial I}{\partial x} + \frac{\partial I}{\partial z}, \tag{12}$$

Wherein $\nabla I$ represents the spatial intensity gradient of the at least one detection point; I represents the optical flow field; x represents a unit distance of the optical flow field along the horizontal axis; and z represents a unit distance of the optical flow field along the vertical axis.

In 820, the second flow velocity of the at least one detection point may be determined based on the time intensity gradient and/or the spatial intensity gradient of the at least one detection point.

The second flow velocity may be a flow velocity of the detection point based on the time intensity gradient and/or the spatial intensity gradient of pixels of the image, which may be represented by an instantaneous speed of the optical flow.

Specifically, assuming that a pixel I(x,z,t) corresponding to the detection point moves a distance of (dx, dz) in dt time on the two adjacent image frames, based on the assumption that the grayscale value of the same pixel does not change before and after the motion, a basic constraint Equation (13) may be obtained:

$$I(x,z,t) = I(x+dx, z+dz, t+dt), \tag{13}$$

Further, a right side of Equation (13) may be expanded based on Taylor formula, and Equation (14) may be obtained:

$$I(x, z, t) = I(x, z, t) + \frac{\partial I}{\partial x}dx + \frac{\partial I}{\partial z}\partial z + \frac{\partial I}{\partial t}dt + \varepsilon, \tag{14}$$

Wherein $\varepsilon$ represents a second-order infinitesimal term, which may be neglectable.

Further, the second flow velocity determination module 240 may simultaneously subtract I(x,z,t) from both ends of Equation (14), and divide by dt at the same time to obtain Equation (15):

$$\frac{\partial I}{\partial x}\frac{dx}{dt} + \frac{\partial I}{\partial z}\frac{dz}{dt} + \frac{\partial I}{\partial t}\frac{dt}{dt} = 0, \tag{15}$$

Wherein $$\frac{\partial I}{\partial x} \text{ and } \frac{\partial I}{\partial z}$$

represent a rate vector $v_x$ of the second flow velocity $v$ along the X-axis and a rate vector $v_z$ of the second flow velocity $v$ along the Z-axis, respectively;

$$\frac{\partial I}{\partial x} \text{ and } \frac{\partial I}{\partial z}$$

represent components of the spatial intensity gradient $\nabla I$ along the X-axis and Z-axis, and $$\frac{\partial I}{\partial t}$$

represents the time intensity gradient $\dot{I}$.

In some embodiments, a relationship among the second flow velocity, the spatial intensity gradient, and the time intensity gradient of the at least one detection point may be represented by Equation (16):

$$\Delta I^* v = \dot{I}, \tag{16}$$

In some embodiments, Equation (16) may be converted into Equation (17):

$$\left(\frac{\partial I}{\partial x} + iI\frac{\phi}{\partial x}\frac{\partial I}{\partial z} + iI\frac{\phi}{\partial z}\right)\binom{v_x}{v_z} = \dot{I}, \tag{17}$$

Wherein i represents the $i^{th}$ image frame;

$$\frac{\partial I}{\partial x} + iI\frac{\phi}{\partial x} \text{ and } \frac{\partial I}{\partial z} + iI\frac{\phi}{\partial z}$$

represent components of position change rates of the optical flow corresponding to the detection point of the $i^{th}$ image frame along the X-axis and Z-axis, respectively; and $\dot{I}$ represents a time change rate of the optical flow corresponding to the detection point.

In some embodiments, let $$\left(\frac{\partial I}{\partial x} + iI\frac{\phi}{\partial x}\frac{\partial I}{\partial z} + iI\frac{\phi}{\partial z}\right) = A, \text{ and } \dot{I} = b,$$

and the formula (17) may be converted into Equation (18):

$$Mv = N, \tag{18}$$

Wherein M represents a spatial intensity gradient matrix corresponding to at least consecutive plurality of image frames; v represents the second flow velocity of the detection point; and N represents a spatial intensity gradient matrix corresponding to the at least consecutive plurality of image frames.

Further, the second flow velocity determination module 240 may obtain $M^T M v = M^T N$ by simultaneously multiplying a transpose $M^T$ of the matrix M.

In some embodiments, the second flow velocity determination module 240 may perform simplification and/or calculation based on a real part of the data: real($M^T M v$)=real ($M^T N$).

Further, the second flow velocity determination module 240 may obtain the second flow velocity based on Equation (19):

$$v = (M^T M)^{-1}(M^T N), \tag{19}$$

Wherein $$M^T N = \begin{bmatrix} \sum_i \frac{\partial I^2}{\partial x} & \sum_i \frac{\partial I}{\partial x}\frac{\partial I}{\partial z} \\ \sum_i \frac{\partial I}{\partial x}\frac{\partial I}{\partial z} & \sum_i \frac{\partial I^2}{\partial z} \end{bmatrix}.$$

In the embodiments of the present disclosure, the second flow velocity of the at least one detection point may be calculated by using an optical flow method based on the image data, and the flow velocity of the detection point in the three-dimensional movement field may be converted into the two-dimensional movement field for calculation.

Figure 9:
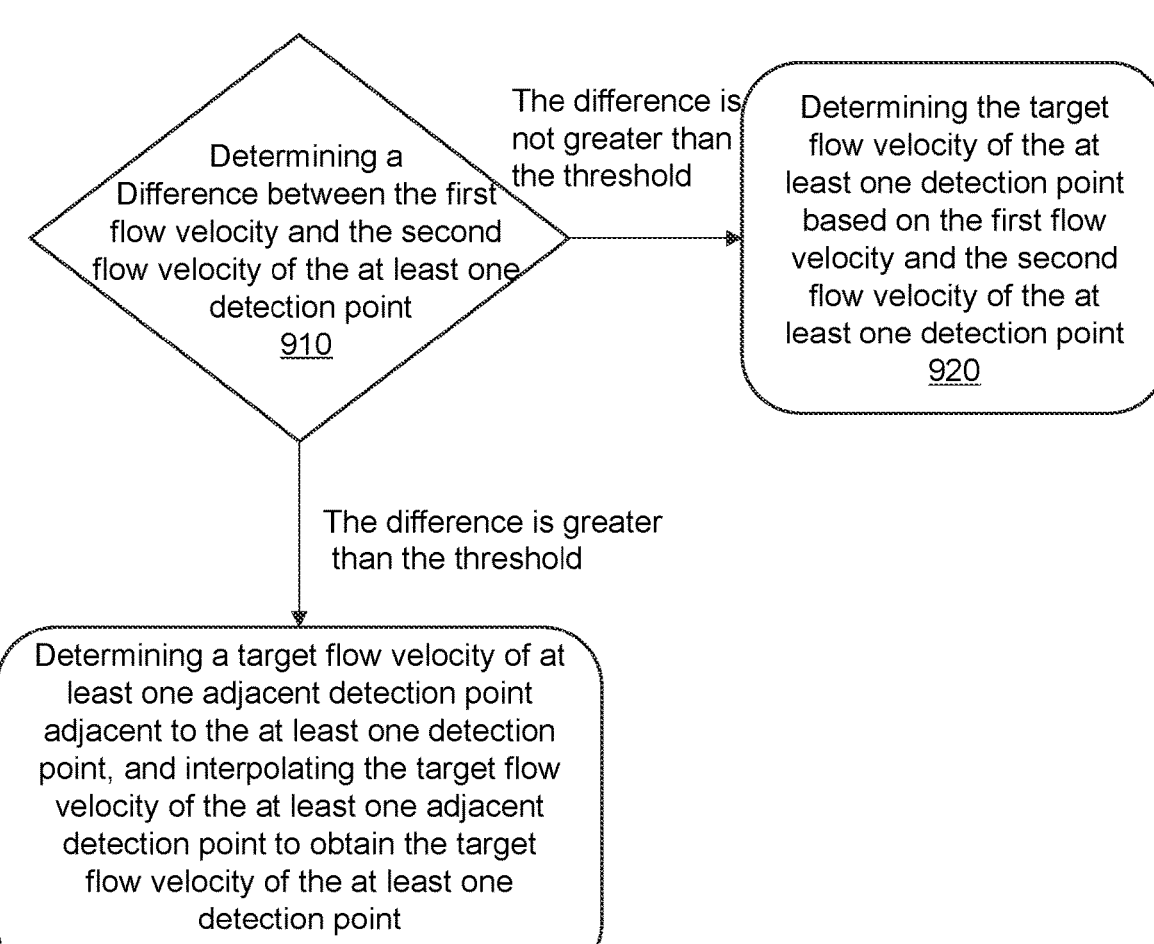
FIG. 9 is a flowchart illustrating an exemplary process of flow velocity calibration according to some embodiments of the present disclosure.

FIG. 9 is a flowchart illustrating an exemplary process of flow velocity calibration according to some embodiments of the present disclosure. In some embodiments, the process 900 may be performed by the scanning device 110 and/or the processing device 120. For example, the process 900 may be implemented as a set of instructions (e.g., an application) stored in a storage device (e.g., the storage device 150). In some embodiments, the flow velocity detection system 100 (e.g., the processing device 120) may execute the set of instructions and may accordingly be directed to perform the process 900. In some embodiments, the process 900 may be accomplished with one or more additional operations not described and/or without one or more of the operations discussed. Additionally, the order of the operations of process 900 illustrated in FIG. 9 and described below is not intended to be limiting.

As set forth above, the first flow velocity may be a flow velocity of the detection point determined based on the phase change of the reflected signals of the detection point; the second flow velocity may be a flow velocity of the detection point determined based on time change and spatial change of pixel intensity of the image. The first flow velocity and the second flow velocity may use the same image data and may be obtained based on the time resolution (phase change) and spatial resolution (pixel intensity) of the system, respectively, which can perform mutual verification and/or calibration.

In 910, a difference between the first flow velocity and the second flow velocity of the at least one detection point may be determined.

The difference between the first flow velocity and the second flow velocity of the at least one detection point may represent a size of the difference in speed and direction between the first flow velocity and the second flow velocity of the at least one detection point.

In some embodiments, the flow velocity calibration module 250 may obtain a speed difference between the first flow velocity and the second flow velocity base on a difference, or a difference percentage, etc., between the first flow velocity and the second flow velocity of the at least one detection point, and For example, a first flow speed of the detection point Q may be 20, a second flow speed may be 22, and a difference between the first flow speed and the second flow speed may be 22−20=2. As another example, the first flow speed of the detection point Q may be 20, the second flow speed may be 30, and a difference between the first flow speed and the second flow speed may be $(30-20)/20 \times 100\% = 50\%$.

In some embodiments, the flow velocity calibration module 250 may obtain a difference in direction between the first flow velocity and the second flow velocity based on a size of an included angle between the first flow velocity and the second flow velocity of the at least one detection point. For example, an included angle between the first flow velocity of the detection point Q and the X-axis may be 30°, an included angle between the second flow velocity and the X-axis, and a difference in direction between the first flow velocity and the second flow velocity may be $40-30=10$.

In some embodiments, the flow velocity calibration module 250 may obtain a difference between the first flow velocity and the second flow velocity based on a size of a modulus of a vector difference between the first flow velocity and the second flow velocity of the at least one detection point. For example, the first flow velocity of the detection point Q may be $\vec{a}$, the second flow velocity may be $\vec{b}$, and the modulus of the vector difference between the first flow velocity and the second flow velocity may be $|\vec{c}| = |\vec{a} - \vec{b}|$.

In 920, in response to that the difference is not greater than a threshold, the target flow velocity of the at least one detection point may be determined based on the first flow velocity and the second flow velocity of the at least one detection point.

The threshold may be a value for evaluating the difference between the first flow velocity and the second flow velocity of the at least one detection point. In some embodiments, the threshold may be set manually in advance.

In some embodiments, the threshold may include a first threshold and a second threshold. The first threshold may be a value for evaluating the difference between the first flow speed and the second flow speed of the at least one detection point. The second threshold may be a value for evaluating the difference in the directions between the first flow velocity and the second flow velocity of the at least one detection point. Further regarding the above example, if the first threshold is 5, the second threshold is 20°, the difference in direction between the first flow velocity and the second flow velocity of the detection point is 10, it may be determined that a target flow velocity of the detection point Q is an average value of the first flow velocity 20 and the second flow velocity 22 of the detection point Q is 21 and an angle that between the direction and the X-axis is 35.

In some embodiments, the threshold may further include a third threshold. The third threshold may be a value for evaluating the difference in speed and direction between the first flow velocity and the second flow velocity of the at least one detection point. Further regarding g the above example, if the third threshold is 6, a difference between a first flow velocity $\vec{a}$ and a second flow velocity $\vec{b}$ of the detection point Q is $|\vec{c}| = 4$, it may be determined that a rate of the target flow velocity of the detection point Q is an average of the first flow velocity and the second flow velocity $$\frac{|\vec{a}| + |\vec{b}|}{2},$$

the direction may be a direction of a resultant vector $\vec{a} + \vec{b}$ of the first flow velocity and the second flow velocity.

In 930, in response to that the difference is greater than the threshold, a target flow velocity of at least one adjacent detection point adjacent to the at least one detection point may be determined, and the target flow velocity of the at least one adjacent detection point may be interpolated to obtain the target flow velocity of the at least one detection point.

It should be understood that when the difference between the first flow velocity and the second flow velocity of the at least one detection point is large, there may be an error in the image data corresponding to the at least one detection point, and the flow velocity calibration module may obtain the target flow velocity based on the target flow velocity of other adjacent detection points.

Further regarding the above example, if the first threshold is 10%, and the difference between the first flow velocity and the second flow velocity of the detection point D is 50%, the target flow velocity of the detection point D may be obtained by interpolation.

In some embodiments, the interpolation may include but is not limited to at least one of the adaptive interpolation algorithms such as a nearest neighbor interpolation, a quadratic interpolation, and a cubic interpolation. In some embodiments, the flow velocity calibration module 250 may select at least one adjacent detection point adjacent to the at least one detection point based on the different interpolation algorithms.

For example, the flow velocity calibration module 250 may use a target flow velocity of the adjacent detection point closest to the detection point as the target flow velocity of the detection point based on the nearest neighbor interpolation algorithm.

As another example, the flow velocity calibration module 250 may select a nearest left detection point and a nearest right detection point of the detection point in a lateral direction based on the quadratic interpolation algorithm, and a nearest upper detection point and a nearest lower detection point of the detection point in a longitudinal direction as nearby detection points of the detection point. Further, an average value of lateral components of a target flow velocity of the nearest left detection point and the right detection point may be obtained as a lateral target flow velocity of the detection point; an average value of longitudinal components of the target flow velocity of the nearest upper detection point and the lower detection point as a longitudinal target flow velocity of the detection point; the target flow velocity of the detection point may be obtained based on the lateral target flow velocity of the detection point and the longitudinal target flow velocity of the detection point.

The beneficial effects of the embodiments of the present disclosure may include but are not limited to: (1) the two-dimensional flow velocity of each detection point may be determined by grouping the array elements and utilizing the location relationship among the transmission point (i.e., the transmission focus), the receiving point (i.e., the array element), and/or the detection point in combination with the phase change. Compared with a multi-angle transmission mode, the condition of the phase change of the reflected signals under multiple angles may be obtained by a single transmission, and the flow velocity of the target object perpendicular to the transmission direction may be detected, which can improve the utilization rate of the system to the data and the accuracy of the system frame rate and speed evaluation; (2) under the full aperture transmission mode, the imaging efficiency can be improved and the divergent wave mode can be adopted, so that the transmission scanning signals can point to the same focus position, which can not only improve the signal-to-noise ratio, but also increase the frame rate of the system, thus improving the time resolution of the system; (3) based on the image data and the utilization of the optic flow method for calculating the second flow velocity of the at least one detection point, the flow velocity of the detection point in the three-dimensional movement field may be converted to the two-dimensional movement field for calculation; (4) the first flow velocity and the second flow velocity may be obtained based on the time resolution (phase change) and spatial resolution (pixel intensity) of the system, respectively, and thus mutual verification and/or calibration may be achieved; (5) by using a pixel beam synthesis method, using GPU parallel computing based on a mode of grouped array elements, computing efficiency may be improved and hardware and time costs may be reduced. It should be understood that different embodiments may have different beneficial effects, in different embodiments, the possible beneficial effects may be any one or a combination of the above, or any other possible beneficial effect.

The basic concepts have been described. Obviously, for those skilled in the art, the detailed disclosure may be only an example and may not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, all aspects of the present disclosure may be performed entirely by hardware, may be performed entirely by software (including firmware, resident software, microcode, etc.), or may be performed by a combination of hardware and software. The above hardware or software may be referred to as "data block", "module", "engine", "unit", or "component". or "system". In addition, aspects of the present disclosure may appear as a computer product located in one or more computer-readable media, the product including computer-readable program code.

The computer storage medium may contain a propagation data signal containing computer program code, for example, on baseband or as part of a carrier wave. The propagation signal may have a variety of forms, including electromagnetic form, optical form, etc., or a suitable combination. The computer storage medium may be any computer-readable medium other than a computer-readable storage medium, which may be connected to an instruction execution system, device, or device to realize communication, propagation, or transmission of a program for use. The program code located on the computer storage medium may be propagated through any suitable medium, including radio, cable, optical fiber cable, RF, or the like, or any combination of the above media.

The computer program code required for the operation of each part of this manual can be written in any one or more program languages, including object-oriented programming languages such as Java, Scala, Smalltalk, Eiffel, jade, emerald, C++, C #, vb.net, python, etc., conventional programming languages such as C language, visual basic, fortran2003, Perl, COBOL 2002, PHP, ABAP, dynamic programming languages such as python, ruby and groovy, or other programming languages. The program code may run completely on the user's computer, or as a separate software package on the user's computer, or partially on the user's computer, partially on the remote computer, or completely on the remote computer or processing device. In the latter case, the remote computer may be connected to the user computer through any network form, such as a local area network (LAN) or a wide area network (WAN), or connected to an external computer (such as the Internet), or in a cloud computing environment, or used as a service such as software as a service (SaaS).

Moreover, unless otherwise specified in the claims, the sequence of the processing elements and sequences of the present application, the use of digital letters, or other names are not used to define the order of the application flow and methods. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various assemblies described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this disclosure may not mean that the present disclosure object requires more features than the features mentioned in the claims. In fact, the features of the embodiments are less than all of the features of the individual embodiments disclosed above.

In some embodiments, the numbers expressing quantities, properties, and so forth, used to describe and claim certain embodiments of the application are to be understood as being modified in some instances by the term "about," "approximate," or "substantially." Unless otherwise stated, "about," "approximate," or "substantially" may indicate a ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Although the numerical domains and parameters used in the present application are used to confirm the range of ranges, the settings of this type are as accurate in the feasible range in the feasible range in the specific embodiments.

Each patent, patent application, patent application publication, and other materials cited herein, such as articles, books, instructions, publications, documents, etc., are hereby incorporated by reference in the entirety. In addition to the application history documents that are inconsistent or conflicting with the contents of the present disclosure, the documents that may limit the widest range of the claim of the present disclosure (currently or later attached to this application) are excluded from the present disclosure. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the disclosure are used only to illustrate the principles of the embodiments of this application. Other modifications may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for flow velocity detection, comprising:

obtaining image data;

determining, based on the image data, a parameter of at least one detection point, the parameter being related to a phase change, the parameter related to the phase change including a phase change rate, wherein the determining, based on the image data, a parameter of at least one detection point includes:

determining, in the image data, at least two frames of image data segments that are adjacent with respect to time and received by each group of array elements of a scanning probe; and determining the phase change rate of the at least one detection point corresponding to the each group of array elements based on the at least two frames of image data segments that are adjacent with respect to time; and determining a first flow velocity of the at least one detection point based on the parameter related to the phase change and a location relationship among the at least one detection point, at least one transmission point, and a plurality of receiving points;

wherein the method further comprises:

grouping the array elements of the scanning probe to obtain a plurality of groups of array elements, wherein the each group of array elements of the plurality of groups of array elements includes one or more array elements; wherein the image data includes a plurality of groups of image data, each group of image data of the plurality of groups of image data corresponds to a group of array elements of the plurality of groups of array elements, and the each group of image data is obtained by performing demodulation and beam synthesis on reflected signals received by the corresponding group of array elements:

wherein the determining a first flow velocity of the at least one detection point based on the parameter related to the phase change and a location relationship among the at least one detection point, at least one transmission point, and a plurality of receiving points includes:

determining a resultant spatial displacement vector corresponding to the each group of array elements based on the location relationship among the at least one detection point, the at least one transmission point, and the plurality of receiving points;

determining a first characteristic matrix corresponding to the each group of array elements based on the resultant spatial displacement vector corresponding to the each group of array elements; and determining the first flow velocity of the at least one detection point based on the phase change rate of the at least one detection point corresponding to the each group of array elements and the first characteristic matrix corresponding to the each group of array elements.

2. The method of claim 1, wherein the obtaining image data includes:

obtaining the image data by utilizing a full aperture transmission.

3. The method of claim 2, wherein the full aperture transmission includes a full aperture transmission under an unfocused wave transmission mode.

4. The method of claim 1, wherein the scanning probe includes any one of a linear array probe, a convex array probe, and a phased array probe.

5. The method of claim 1, wherein the determining the first flow velocity of the at least one detection point based on the phase change rate of the at least one detection point corresponding to the each group of array elements and the first characteristic matrix corresponding to the each group of array elements includes:

determining a first auxiliary calculation matrix corresponding to the each group of array elements based on the phase change rate of the at least one detection point corresponding to the each group of array elements and the first characteristic matrix corresponding to the each group of array elements;

determining a second auxiliary calculation matrix corresponding to the each group of array elements based on the first characteristic matrix corresponding to the each group of array elements;

determining a third auxiliary calculation matrix by accumulating the first auxiliary calculation matrix corresponding to the each group of array elements;

determining a fourth auxiliary calculation matrix by accumulating the second auxiliary calculation matrix corresponding to the each group of array elements; and determining the first flow velocity of the at least one detection point based on the third auxiliary calculation matrix and the fourth auxiliary calculation matrix.

6. The method of claim 1, wherein the determining a resultant spatial displacement vector corresponding to the each group of array elements based on the location relationship among the at least one detection point, the at least one transmission point, and the plurality of receiving points includes:

determining a spatial displacement vector corresponding to each receiving point of the plurality of receiving points based on a location relationship among the at least one detection point, the at least one transmission point, and the each receiving point; and determining the resultant spatial displacement vector corresponding to the each group of array elements based on the spatial displacement vector corresponding to the each receiving point and a weight corresponding to the each receiving point.

7. The method of claim 6, wherein the determining the resultant spatial displacement vector corresponding to the each group of array elements based on the spatial displacement vector corresponding to the each receiving point and a weight corresponding to the each receiving point includes:

determining, using the weight of the each receiving point in the each group of array elements, a weighed sum of the spatial displacement vector of the each receiving point in the each group of array elements to obtain the resultant spatial displacement vector corresponding to the each group of array elements.

8. The method of claim 6, wherein the weight corresponding to the each receiving point is determined based on a distance between the each receiving point and the at least one detection point.

9. The method of claim 1, further comprising:

determining, based on the image data, a time intensity gradient and a spatial intensity gradient of the at least one detection point; and determining a second flow velocity of the at least one detection point based on the time intensity gradient and the spatial intensity gradient of the at least one detection point.

10. The method of claim 9, further comprising:

performing a velocity calibration based on the first flow velocity and the second flow velocity of the at least one detection point to obtain a target flow velocity of the at least one detection point.

11. The method of claim 10, wherein the velocity calibration includes:

determining a difference between the first flow velocity and the second flow velocity of the at least one detection point;

in response to that the difference is not greater than a threshold, determining the target flow velocity of the at least one detection point based on the first flow velocity and the second flow velocity of the at least one detection point; and in response to that the difference is greater than the threshold, determining a target flow velocity of at least one adjacent detection point adjacent to the at least one detection point, and interpolating the target flow velocity of the at least one adjacent detection point to obtain the target flow velocity of the at least one detection point.

12. The method of claim 1, wherein the image data includes data obtained by scanning under a mode B.

13. The method of claim 1, wherein the determining a first flow velocity of the at least one detection point includes:

determining the first flow velocity of the at least one detection point by graphics processing unit (GPU) parallel computing.

14. The method of claim 1, further comprising:

grouping the array elements of the scanning probe to obtain a plurality of groups of array elements, wherein the each group of array elements of the plurality of groups of array elements includes one or more array elements, the image data includes a plurality of groups of image data, each group of image data of the plurality of groups of image data corresponds to a group of array elements of the plurality of groups of array elements, and the each group of image data is obtained by performing demodulation and beam synthesis on reflected signals received by the corresponding group of array elements.

15. A system for flow velocity detection, comprising:

at least one storage medium storing a set of instructions;

at least one processor in communication with the at least one storage medium, when executing the stored set of instructions, the at least one processor causes the system to:

obtain image data;

determine, based on the image data, a parameter of at least one detection point, the parameter being related to a phase change, the parameter related to the phase change including a phase change rate, wherein the determining, based on the image data, a parameter of at least one detection point includes:

determining, in the image data, at least two frames of image data segments that are adjacent with respect to time and received by each group of array elements of a scanning probe; and determining the phase change rate of the at least one detection point corresponding to the each group of array elements based on the at least two frames of image data segments that are adjacent with respect to time; and determine a first flow velocity of the at least one detection point based on the parameter related to the phase change and a location relationship among the at least one detection point, at least one transmission point, and a plurality of receiving points;

wherein the method further comprises:

grouping the array elements of the scanning probe to obtain a plurality of groups of array elements, wherein the each group of array elements of the plurality of groups of array elements includes one or more array elements; wherein the image data includes a plurality of groups of image data, each group of image data of the plurality of groups of image data corresponds to a group of array elements of the plurality of groups of array elements, and the each group of image data is obtained by performing demodulation and beam synthesis on reflected signals received by the corresponding group of array elements;

wherein the determining a first flow velocity of the at least one detection point based on the parameter related to the phase change and a location relationship among the at least one detection point, at least one transmission point, and a plurality of receiving points includes:

calculating a characteristic matrix for the each group of array elements of the plurality of groups of array elements, based on the parameter related to the phase change and the location relationship among the at least one detection point, the at least one transmission point, and the plurality of receiving points; and integrating calculation results of the plurality of groups of array elements to obtain the first flow velocity of the at least one detection point.

16. A non-transitory computer readable medium including executable instructions, the instructions, when executed by at least one processor, causing the at least one processor to effectuate a method comprising:

obtaining image data;

determining, based on the image data, a parameter of at least one detection point, the parameter being related to a phase change, the parameter related to the phase change including a phase change rate, wherein the determining, based on the image data, a parameter of at least one detection point includes:

determining, in the image data, at least two frames of image data segments that are adjacent with respect to time and received by each group of array elements of a scanning probe; and determining the phase change rate of the at least one detection point corresponding to the each group of array elements based on the at least two frames of image data segments that are adjacent with respect to time; and determining a first flow velocity of the at least one detection point based on the parameter related to the phase change and a location relationship among the at least one detection point, at least one transmission point, and a plurality of receiving points;

wherein the method further comprises:

grouping the array elements of the scanning probe to obtain a plurality of groups of array elements, wherein the each group of array elements of the plurality of groups of array elements includes one or more array elements; wherein the image data includes a plurality of groups of image data, each group of image data of the plurality of groups of image data corresponds to a group of array elements of the plurality of groups of array elements, and the each group of image data is obtained by performing demodulation and beam synthesis on reflected signals received by the corresponding group of array elements wherein the determining a first flow velocity of the at least one detection point based on the parameter related to the phase change and a location relationship among the at least one detection point, at least one transmission point, and a plurality of receiving points includes:

determining a resultant spatial displacement vector corresponding to the each group of array elements based on the location relationship among the at least one detection point, the at least one transmission point, and the plurality of receiving points;

determining a first characteristic matrix corresponding to the each group of array elements based on the resultant spatial displacement vector corresponding to the each group of array elements; and determining the first flow velocity of the at least one detection point based on the phase change rate of the at least one detection point corresponding to the each group of array elements and the first characteristic matrix corresponding to the each group of array elements.

\* \* \* \* \*